(12) United States Patent
Lynam

(10) Patent No.: US 11,072,288 B2
(45) Date of Patent: Jul. 27, 2021

(54) VEHICULAR EXTERIOR REARVIEW MIRROR ASSEMBLY WITH BLIND SPOT INDICATOR ELEMENT

(71) Applicant: MAGNA MIRRORS OF AMERICA, INC., Holland, MI (US)

(72) Inventor: Niall R. Lynam, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/949,634

(22) Filed: Nov. 9, 2020

(65) Prior Publication Data

US 2021/0053495 A1 Feb. 25, 2021

Related U.S. Application Data

(63) Continuation of application No. 16/429,166, filed on Jun. 3, 2019, now Pat. No. 10,829,053, which is a
(Continued)

(51) Int. Cl.
*B60R 1/12* (2006.01)
*B60Q 1/00* (2006.01)
(Continued)

(52) U.S. Cl.
CPC .......... *B60R 1/1207* (2013.01); *B60Q 1/0023* (2013.01); *B60Q 1/26* (2013.01);
(Continued)

(58) Field of Classification Search
CPC ..... B60R 1/1207; B60R 1/0602; B60R 1/088; B60R 2001/1215; B60R 2001/1223;
(Continued)

(56) References Cited

U.S. PATENT DOCUMENTS

| 1,096,452 A | 5/1914 | Perrin |
| 1,563,258 A | 11/1925 | Cunningham |

(Continued)

FOREIGN PATENT DOCUMENTS

| AU | A-40317/95 | 2/1995 |
| CA | 1063695 A | 10/1979 |

(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.
(Continued)

*Primary Examiner* — Anne M Hines
(74) *Attorney, Agent, or Firm* — Honigman LLP

(57) ABSTRACT

A vehicular exterior rearview mirror assembly includes a mirror reflective element sub-assembly having a mirror reflective element, a mirror back plate and a heater pad disposed between the mirror reflective element and the mirror back plate. The heater pad is adhered via a pressure sensitive adhesive to the glass substrate of the mirror reflective element, and the mirror back plate is adhered via a pressure sensitive adhesive to the heater pad. The mirror back plate includes first structure that is configured to attach at an actuator. A blind spot indicator element is disposed second structure of the mirror back plate. When the vehicular exterior rearview mirror assembly is attached at the vehicle and when a light source of the indicator element is activated, an icon present at an outboard region of said electrochromic mirror reflective element is illuminated and is viewable by the driver of the vehicle.

25 Claims, 14 Drawing Sheets

Related U.S. Application Data continuation of application No. 16/214,294, filed on Dec. 10, 2018, now Pat. No. 10,308,186, which is a continuation of application No. 15/700,270, filed on Sep. 11, 2017, now Pat. No. 10,150,417, which is a continuation of application No. 15/638,663, filed on Jun. 30, 2017, now Pat. No. 9,758,102, which is a continuation of application No. 14/726,907, filed on Jun. 1, 2015, now Pat. No. 9,694,753, which is a continuation of application No. 14/486,133, filed on Sep. 15, 2014, now Pat. No. 9,045,091, which is a continuation of application No. 13/646,960, filed on Oct. 8, 2012, now Pat. No. 8,833,987, which is a continuation of application No. 13/335,135, filed on Dec. 22, 2011, now Pat. No. 8,282,253, which is a continuation of application No. 12/550,054, filed on Aug. 28, 2009, now Pat. No. 8,083,386, which is a continuation of application No. 11/520,193, filed on Sep. 13, 2006, now Pat. No. 7,581,859.

(60) Provisional application No. 60/717,093, filed on Sep. 14, 2005.

(51) Int. Cl.
*B60R 1/06* (2006.01)
*B60R 1/08* (2006.01)
*B60Q 1/26* (2006.01)

(52) U.S. Cl.
CPC .......... *B60Q 1/2665* (2013.01); *B60R 1/0602* (2013.01); *B60R 1/088* (2013.01); *B60R 2001/1215* (2013.01); *B60R 2001/1223* (2013.01); *B60R 2001/1284* (2013.01)

(58) Field of Classification Search
CPC .......... B60R 2001/1284; B60Q 1/0023; B60Q 1/26; B60Q 1/2665
See application file for complete search history.

(56) References Cited

U.S. PATENT DOCUMENTS

| | | |
|---|---|---|
| 2,069,368 A | 2/1937 | Horinstein |
| 2,166,303 A | 7/1939 | Hodney et al. |
| 2,263,382 A | 11/1941 | Gotzinger |
| 2,414,223 A | 1/1947 | De Virgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Athur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maru |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein et al. |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage, Jr. |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Giglia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |

(56) References Cited

U.S. PATENT DOCUMENTS

| | | |
|---|---|---|
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Lino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhauser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jenkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schoniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,306 A | 9/1992 | Yamada et al. |

(56) References Cited

U.S. PATENT DOCUMENTS

| | | |
|---|---|---|
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,166,815 A | 11/1992 | Elderfield |
| 5,168,378 A | 12/1992 | Black |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlais et al. |
| 5,189,537 A | 2/1993 | O'Farrell |
| 5,193,029 A | 3/1993 | Schofield et al. |
| 5,197,562 A | 3/1993 | Kakinami et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,340,503 A | 8/1994 | Varaprasad et al. |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Lino |
| 5,515,448 A | 5/1996 | Nishitani |
| 5,519,621 A | 5/1996 | Wortham |
| 5,521,744 A | 5/1996 | Mazurek |
| 5,521,760 A | 5/1996 | De Young et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenk et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |

(56) References Cited

U.S. PATENT DOCUMENTS

| | | |
|---|---|---|
| 5,602,542 A | 2/1997 | Widmann |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clarke, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| D394,833 S | 6/1998 | Muth |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A | 12/1998 | Van Ryzin |
| 5,848,373 A | 12/1998 | DeLorme et al. |
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,900,999 A | 5/1999 | Huizenga et al. |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |

(56) References Cited

U.S. PATENT DOCUMENTS

| | | |
|---|---|---|
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,942,895 A | 8/1999 | Popovic et al. |
| 5,947,586 A | 9/1999 | Weber |
| 5,949,331 A | 9/1999 | Schofield et al. |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,975,715 A | 11/1999 | Bauder |
| 5,984,482 A | 11/1999 | Rumsey et al. |
| 5,986,364 A | 11/1999 | Bingle et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,983 A | 12/1999 | Alland et al. |
| 6,005,724 A | 12/1999 | Todd |
| 6,007,222 A | 12/1999 | Thau |
| 6,008,486 A | 12/1999 | Stam et al. |
| 6,008,871 A | 12/1999 | Okumura |
| 6,009,359 A | 12/1999 | El-Hakim et al. |
| 6,016,035 A | 1/2000 | Eberspacher et al. |
| 6,016,215 A | 1/2000 | Byker |
| 6,019,411 A | 2/2000 | Carter et al. |
| 6,019,475 A | 2/2000 | Lynam et al. |
| 6,020,987 A | 2/2000 | Baumann et al. |
| 6,021,371 A | 2/2000 | Fultz |
| 6,023,229 A | 2/2000 | Bugno et al. |
| 6,025,872 A | 2/2000 | Ozaki et al. |
| 6,028,537 A | 2/2000 | Suman et al. |
| 6,037,689 A | 3/2000 | Bingle et al. |
| 6,040,939 A | 3/2000 | Demiryont et al. |
| 6,042,253 A | 3/2000 | Fant, Jr. et al. |
| 6,042,934 A | 3/2000 | Guiselin et al. |
| 6,045,243 A | 4/2000 | Muth et al. |
| 6,045,643 A | 4/2000 | Byker et al. |
| 6,046,766 A | 4/2000 | Sakata |
| 6,046,837 A | 4/2000 | Yamamoto |
| 6,049,171 A | 4/2000 | Stam et al. |
| D425,466 S | 5/2000 | Todd et al. |
| 6,060,989 A | 5/2000 | Gehlot |
| 6,061,002 A | 5/2000 | Weber et al. |
| 6,062,920 A | 5/2000 | Jordan et al. |
| 6,064,508 A | 5/2000 | Forgette et al. |
| 6,065,840 A | 5/2000 | Caskey et al. |
| 6,066,920 A | 5/2000 | Torihara et al. |
| 6,067,111 A | 5/2000 | Hahn et al. |
| 6,067,500 A | 5/2000 | Morimoto et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,072,391 A | 6/2000 | Suzuki et al. |
| 6,074,077 A | 6/2000 | Pastrick et al. |
| 6,074,777 A | 6/2000 | Reimers et al. |
| 6,076,948 A | 6/2000 | Bukosky et al. |
| 6,078,355 A | 6/2000 | Zengel |
| 6,078,865 A | 6/2000 | Koyanagi |
| D428,372 S | 7/2000 | Todd et al. |
| D428,373 S | 7/2000 | Todd et al. |
| 6,082,881 A | 7/2000 | Hicks |
| 6,084,700 A | 7/2000 | Knapp et al. |
| 6,086,131 A | 7/2000 | Bingle et al. |
| 6,086,229 A | 7/2000 | Pastrick |
| 6,087,012 A | 7/2000 | Varaprasad et al. |
| 6,087,953 A | 7/2000 | DeLine et al. |
| 6,091,343 A | 7/2000 | Dykema et al. |
| 6,093,976 A | 7/2000 | Kramer et al. |
| 6,094,618 A | 7/2000 | Harada |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,097,316 A | 8/2000 | Liaw et al. |
| 6,099,131 A | 8/2000 | Fletcher et al. |
| 6,099,155 A | 8/2000 | Pastrick et al. |
| 6,102,546 A | 8/2000 | Carter |
| 6,102,559 A | 8/2000 | Nold et al. |
| 6,104,552 A | 8/2000 | Thau et al. |
| 6,106,121 A | 8/2000 | Buckley et al. |
| 6,111,498 A | 8/2000 | Jobes et al. |
| 6,111,683 A | 8/2000 | Cammenga et al. |
| 6,111,684 A | 8/2000 | Forgette et al. |
| 6,111,685 A | 8/2000 | Tench et al. |
| 6,111,696 A | 8/2000 | Allen et al. |
| 6,115,086 A | 9/2000 | Rosen |
| 6,115,651 A | 9/2000 | Cruz |
| 6,116,743 A | 9/2000 | Hoek |
| 6,118,219 A | 9/2000 | Okigami et al. |
| 6,122,597 A | 9/2000 | Saneyoshi et al. |
| 6,122,921 A | 9/2000 | Brezoczky et al. |
| 6,124,647 A | 9/2000 | Marcus et al. |
| 6,124,886 A | 9/2000 | DeLine et al. |
| 6,127,919 A | 10/2000 | Wylin |
| 6,127,945 A | 10/2000 | Mura-Smith |
| 6,128,576 A | 10/2000 | Nishimoto et al. |
| 6,130,421 A | 10/2000 | Bechtel et al. |
| 6,130,448 A | 10/2000 | Bauer et al. |
| 6,132,072 A | 10/2000 | Turnbull et al. |
| 6,137,620 A | 10/2000 | Guarr et al. |
| 6,139,171 A | 10/2000 | Waldmann |
| 6,139,172 A | 10/2000 | Bos et al. |
| 6,140,933 A | 10/2000 | Bugno et al. |
| 6,142,656 A | 11/2000 | Kurth |
| 6,146,003 A | 11/2000 | Thau |
| 6,147,934 A | 11/2000 | Arikawa et al. |
| 6,148,261 A | 11/2000 | Obradovich et al. |
| 6,149,287 A | 11/2000 | Pastrick et al. |
| 6,150,014 A | 11/2000 | Chu et al. |
| 6,151,065 A | 11/2000 | Steed et al. |
| 6,151,539 A | 11/2000 | Bergholz et al. |
| 6,152,551 A | 11/2000 | Annas |
| 6,152,590 A | 11/2000 | Furst et al. |
| 6,154,149 A | 11/2000 | Tyckowski et al. |
| 6,154,306 A | 11/2000 | Varaprasad et al. |
| 6,157,294 A | 12/2000 | Urai et al. |
| 6,157,418 A | 12/2000 | Rosen |
| 6,157,424 A | 12/2000 | Eichenlaub |
| 6,157,480 A | 12/2000 | Anderson et al. |
| 6,158,655 A | 12/2000 | DeVries, Jr. et al. |
| 6,161,865 A | 12/2000 | Rose et al. |
| 6,164,564 A | 12/2000 | Franco et al. |
| 6,166,625 A | 12/2000 | Teowee et al. |
| 6,166,629 A | 12/2000 | Hamma et al. |
| 6,166,834 A | 12/2000 | Taketomi et al. |

(56) References Cited

U.S. PATENT DOCUMENTS

| | | |
|---|---|---|
| 6,166,847 A | 12/2000 | Tench et al. |
| 6,166,848 A | 12/2000 | Cammenga et al. |
| 6,167,255 A | 12/2000 | Kennedy, III et al. |
| 6,167,755 B1 | 1/2001 | Damson et al. |
| 6,169,955 B1 | 1/2001 | Fultz |
| 6,170,956 B1 | 1/2001 | Rumsey et al. |
| 6,172,600 B1 | 1/2001 | Kakinami et al. |
| 6,172,601 B1 | 1/2001 | Wada et al. |
| 6,172,613 B1 | 1/2001 | DeLine et al. |
| 6,173,501 B1 | 1/2001 | Blank et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,178,377 B1 | 1/2001 | Ishihara et al. |
| 6,181,387 B1 | 1/2001 | Rosen |
| 6,182,006 B1 | 1/2001 | Meek |
| 6,183,119 B1 | 2/2001 | Desmond et al. |
| 6,184,679 B1 | 2/2001 | Popovic et al. |
| 6,184,781 B1 | 2/2001 | Ramakesavan |
| 6,185,492 B1 | 2/2001 | Kagawa et al. |
| 6,185,501 B1 | 2/2001 | Smith et al. |
| 6,188,505 B1 | 2/2001 | Lomprey et al. |
| 6,191,704 B1 | 2/2001 | Takenaga et al. |
| 6,193,912 B1 | 2/2001 | Thieste et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,014 B1 | 3/2001 | Walker et al. |
| 6,199,810 B1 | 3/2001 | Wu et al. |
| 6,200,010 B1 | 3/2001 | Anders |
| 6,201,642 B1 | 3/2001 | Bos |
| 6,206,553 B1 | 3/2001 | Boddy et al. |
| 6,207,083 B1 | 3/2001 | Varaprasad et al. |
| 6,210,008 B1 | 4/2001 | Hoekstra et al. |
| 6,210,012 B1 | 4/2001 | Broer |
| 6,212,470 B1 | 4/2001 | Seymour et al. |
| 6,213,612 B1 | 4/2001 | Schnell et al. |
| 6,217,181 B1 | 4/2001 | Lynam et al. |
| 6,218,934 B1 | 4/2001 | Regan |
| 6,222,447 B1 | 4/2001 | Schofield et al. |
| 6,222,460 B1 | 4/2001 | DeLine et al. |
| 6,222,689 B1 | 4/2001 | Higuchi et al. |
| 6,227,689 B1 | 5/2001 | Miller |
| 6,229,226 B1 | 5/2001 | Kramer et al. |
| 6,232,937 B1 | 5/2001 | Jacobsen et al. |
| 6,236,514 B1 | 5/2001 | Sato |
| 6,239,851 B1 | 5/2001 | Hatazawa et al. |
| 6,239,898 B1 | 5/2001 | Byker et al. |
| 6,239,899 B1 | 5/2001 | DeVries et al. |
| 6,243,003 B1 | 6/2001 | DeLine et al. |
| 6,243,218 B1 | 6/2001 | Whitehead |
| 6,244,716 B1 | 6/2001 | Steenwyk et al. |
| 6,245,262 B1 | 6/2001 | Varaprasad et al. |
| 6,247,820 B1 | 6/2001 | Van Order |
| 6,249,214 B1 | 6/2001 | Kashiwazaki |
| 6,249,310 B1 | 6/2001 | Lefkowitz |
| 6,249,369 B1 | 6/2001 | Theiste et al. |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,419 B1 | 11/2001 | Platzer, Jr. |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Furst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |

(56) References Cited

U.S. PATENT DOCUMENTS

| | | |
|---|---|---|
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,467,920 B2 | 10/2002 | Schnell et al. |
| 6,471,362 B1 | 10/2002 | Carter et al. |
| 6,472,977 B1 | 10/2002 | Pochmuller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek |
| 6,515,378 B2 | 2/2003 | Drummond et al. |
| 6,515,581 B1 | 2/2003 | Ho |
| 6,515,582 B1 | 2/2003 | Teowee et al. |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull |
| 6,542,085 B1 | 4/2003 | Yang |
| 6,542,182 B1 | 4/2003 | Chutorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,552,653 B2 | 4/2003 | Nakaho et al. |
| 6,553,308 B1 | 4/2003 | Uhlmann et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,567,708 B1 | 5/2003 | Bechtel et al. |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takahashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,582,109 B2 | 6/2003 | Miller |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,612,723 B2 | 9/2003 | Futhey et al. |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,313 B2 | 9/2003 | Furst et al. |
| 6,616,764 B2 | 9/2003 | Kramer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | Deline et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,663,262 B2 | 12/2003 | Boyd et al. |
| 6,665,592 B2 | 12/2003 | Kodama |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsberg et al. |
| 6,678,083 B1 | 1/2004 | Anstee |

(56) References Cited

U.S. PATENT DOCUMENTS

| | | |
|---|---|---|
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,685,864 B2 | 2/2004 | Bingle et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,709,136 B2 | 3/2004 | Pastrick et al. |
| 6,713,783 B1 | 3/2004 | Mase et al. |
| 6,717,109 B1 | 4/2004 | MacHer et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjonell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendort et al. |
| 6,755,542 B2 | 6/2004 | Bechtel et al. |
| 6,755,544 B2 | 6/2004 | Schnell et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |
| 6,823,261 B2 | 11/2004 | Sekiguchi |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |
| 6,845,805 B1 | 1/2005 | Koster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Kloppel et al. |
| 6,853,491 B1 | 2/2005 | Ruhle et al. |
| 6,855,431 B2 | 2/2005 | Varaprasad et al. |
| 6,859,148 B2 | 2/2005 | Miller et al. |
| 6,861,789 B2 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,891,677 B2 | 5/2005 | Nilsen et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |
| 6,906,632 B2 | 6/2005 | DeLine et al. |
| 6,909,486 B2 | 6/2005 | Wang et al. |
| 6,910,779 B2 | 6/2005 | Abel et al. |
| 6,912,396 B2 | 6/2005 | Sziraki et al. |
| 6,914,521 B2 | 7/2005 | Rothkop |
| 6,916,099 B2 | 7/2005 | Su et al. |
| 6,916,100 B2 | 7/2005 | Pavao |
| 6,917,404 B2 | 7/2005 | Baek |
| 6,918,674 B2 | 7/2005 | Drummond et al. |
| 6,919,796 B2 | 7/2005 | Boddy et al. |
| 6,922,902 B2 | 8/2005 | Schierbeek et al. |
| 6,926,431 B1 | 8/2005 | Foote et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,933,837 B2 | 8/2005 | Gunderson et al. |
| 6,934,067 B2 | 8/2005 | Ash et al. |
| 6,940,423 B2 | 9/2005 | Takagi et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,950,035 B2 | 9/2005 | Tanaka et al. |
| 6,951,410 B2 | 10/2005 | Parsons |
| 6,951,681 B2 | 10/2005 | Hartley et al. |
| 6,952,312 B2 | 10/2005 | Weber et al. |
| 6,958,495 B2 | 10/2005 | Nishijima et al. |
| 6,958,683 B2 | 10/2005 | Mills et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,438 B2 | 11/2005 | Busscher et al. |
| 6,968,273 B2 | 11/2005 | Ockerse et al. |
| 6,971,181 B2 | 12/2005 | Ohm et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,989,736 B2 | 1/2006 | Berberich et al. |
| 6,992,573 B2 | 1/2006 | Blank et al. |
| 6,992,718 B1 | 1/2006 | Takahara |
| 6,992,826 B2 | 1/2006 | Wang |
| 6,995,687 B2 | 2/2006 | Lang et al. |
| 6,997,571 B2 | 2/2006 | Tenmyo |
| 7,001,058 B2 | 2/2006 | Inditsky |
| 7,004,592 B2 | 2/2006 | Varaprasad et al. |
| 7,004,593 B2 | 2/2006 | Weller et al. |
| 7,005,974 B2 | 2/2006 | McMahon et al. |
| 7,006,173 B1 | 2/2006 | Hiyama et al. |
| 7,008,090 B2 | 3/2006 | Blank |
| 7,009,751 B2 | 3/2006 | Tonar et al. |

(56) References Cited

U.S. PATENT DOCUMENTS

| | | |
|---|---|---|
| 7,012,543 B2 | 3/2006 | DeLine et al. |
| 7,012,727 B2 | 3/2006 | Hutzel et al. |
| 7,023,331 B2 | 4/2006 | Kodama |
| 7,029,156 B2 | 4/2006 | Suehiro et al. |
| 7,030,738 B2 | 4/2006 | Ishii |
| 7,030,775 B2 | 4/2006 | Sekiguchi |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,505 B2 | 6/2006 | Iwamoto |
| 7,057,681 B2 | 6/2006 | Hinata et al. |
| 7,063,893 B2 | 6/2006 | Hoffman |
| 7,064,882 B2 | 6/2006 | Tonar et al. |
| 7,068,289 B2 | 6/2006 | Satoh et al. |
| 7,073,914 B2 | 7/2006 | Pavao |
| 7,074,486 B2 | 7/2006 | Boire et al. |
| 7,080,914 B1 | 7/2006 | Boddy |
| 7,081,810 B2 | 7/2006 | Henderson et al. |
| 7,083,312 B2 | 8/2006 | Pastrick et al. |
| 7,085,633 B2 | 8/2006 | Nishira et al. |
| 7,090,363 B1 | 8/2006 | Boddy |
| 7,092,052 B2 | 8/2006 | Okamoto et al. |
| 7,095,432 B2 | 8/2006 | Nakayama et al. |
| 7,095,567 B2 | 8/2006 | Troxell et al. |
| 7,097,312 B2 | 8/2006 | Platzer, Jr. |
| 7,106,213 B2 | 9/2006 | White |
| 7,106,392 B2 | 9/2006 | You |
| 7,108,409 B2 | 9/2006 | DeLine et al. |
| 7,110,021 B2 | 9/2006 | Nobori et al. |
| 7,114,554 B2 | 10/2006 | Bergman et al. |
| 7,121,028 B2 | 10/2006 | Shoen et al. |
| 7,125,131 B2 | 10/2006 | Olczak |
| 7,126,456 B2 | 10/2006 | Boddy et al. |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,150,552 B2 | 12/2006 | Weidel |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,202,987 B2 | 4/2007 | Varaprasad et al. |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,233,304 B1 | 6/2007 | Aratani et al. |
| 7,235,918 B2 | 6/2007 | McCullough et al. |
| 7,241,030 B2 | 7/2007 | Mok et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,283 B2 | 7/2007 | Takagi et al. |
| 7,248,305 B2 | 7/2007 | Ootsuta et al. |
| 7,249,860 B2 | 7/2007 | Kulas et al. |
| 7,251,079 B2 | 7/2007 | Capaldo et al. |
| 7,253,723 B2 | 8/2007 | Lindahl et al. |
| 7,255,451 B2 | 8/2007 | McCabe et al. |
| 7,255,465 B2 | 8/2007 | DeLine et al. |
| 7,259,036 B2 | 8/2007 | Borland et al. |
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,300,183 B2 | 11/2007 | Kiyomoto et al. |
| 7,302,344 B2 | 11/2007 | Olney et al. |
| 7,304,661 B2 | 12/2007 | Ishikura |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,172 B2 | 1/2008 | Yamazaki |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,400,435 B2 | 7/2008 | Byers et al. |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Scholfield et al. |
| 7,446,924 B2 | 11/2008 | Schofield et al. |
| 7,448,776 B2 | 11/2008 | Tang |
| 7,452,090 B2 | 11/2008 | Weller et al. |

(56) References Cited

U.S. PATENT DOCUMENTS

| | | |
|---|---|---|
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,492,281 B2 | 2/2009 | Lynam et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,720,580 B2 | 5/2010 | Higgins-Luthman |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,881,496 B2 | 2/2011 | Camilleri et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |
| 8,019,505 B2 | 9/2011 | Schofield et al. |
| 8,027,691 B2 | 9/2011 | Bemas et al. |
| 8,044,776 B2 | 10/2011 | Schofield et al. |
| 8,047,667 B2 | 11/2011 | Weller et al. |
| 8,049,640 B2 | 11/2011 | Uken et al. |
| 8,063,753 B2 | 11/2011 | DeLine et al. |
| 8,072,318 B2 | 12/2011 | Lynam et al. |
| 8,083,386 B2 | 12/2011 | Lynam |
| 8,094,002 B2 | 1/2012 | Schofield et al. |
| 8,095,260 B1 | 1/2012 | Schofield et al. |
| 8,095,310 B2 | 1/2012 | Taylor et al. |
| 8,100,568 B2 | 1/2012 | DeLine et al. |
| 8,106,347 B2 | 1/2012 | Drummond et al. |
| 8,282,253 B2 | 10/2012 | Lynam |
| 8,833,987 B2 | 9/2014 | Lynam |
| 9,045,091 B2 | 6/2015 | Lynam |
| 9,308,867 B2 | 4/2016 | Henion et al. |
| 9,694,753 B2 | 7/2017 | Lynam |
| 9,758,102 B1 | 9/2017 | Lynam |
| 10,150,417 B2 | 12/2018 | Lynam |
| 10,308,186 B2 | 6/2019 | Lynam |
| 10,829,053 B2 | 11/2020 | Lynam |
| 2001/0026316 A1 | 10/2001 | Senatore |
| 2001/0035853 A1 | 11/2001 | Hoelen et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |

(56) References Cited

U.S. PATENT DOCUMENTS

| | | |
|---|---|---|
| 2002/0149727 A1 | 10/2002 | Wang |
| 2002/0154007 A1 | 10/2002 | Yang |
| 2003/0002165 A1 | 1/2003 | Mathias et al. |
| 2003/0007261 A1 | 1/2003 | Hutzel et al. |
| 2003/0030724 A1 | 2/2003 | Okamoto |
| 2003/0069690 A1 | 4/2003 | Correia et al. |
| 2003/0090568 A1 | 5/2003 | Pico |
| 2003/0090569 A1 | 5/2003 | Poechmueller |
| 2003/0098908 A1 | 5/2003 | Misaiji et al. |
| 2003/0103142 A1 | 6/2003 | Hitomi et al. |
| 2003/0122929 A1 | 7/2003 | Minaudo et al. |
| 2003/0133014 A1 | 7/2003 | Mendoza |
| 2003/0137586 A1 | 7/2003 | Lewellen |
| 2003/0156193 A1 | 8/2003 | Nakamura |
| 2003/0169158 A1 | 9/2003 | Paul |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross |
| 2003/0227546 A1 | 12/2003 | Hilborn et al. |
| 2004/0004541 A1 | 1/2004 | Hong |
| 2004/0027695 A1 | 2/2004 | Lin |
| 2004/0036768 A1 | 2/2004 | Green |
| 2004/0080404 A1 | 4/2004 | White |
| 2004/0239243 A1 | 12/2004 | Roberts et al. |
| 2004/0239849 A1 | 12/2004 | Wang |
| 2005/0018738 A1 | 1/2005 | Duan et al. |
| 2005/0024591 A1 | 2/2005 | Lian et al. |
| 2005/0117095 A1 | 6/2005 | Ma |
| 2005/0168995 A1 | 8/2005 | Kittelmann et al. |
| 2005/0237440 A1 | 10/2005 | Sugimura et al. |
| 2005/0270766 A1 | 12/2005 | Kung et al. |
| 2006/0001641 A1 | 1/2006 | Degwekar et al. |
| 2006/0050018 A1 | 3/2006 | Hutzel et al. |
| 2006/0056003 A1 | 3/2006 | Tonar et al. |
| 2006/0056086 A1 | 3/2006 | Hannah |
| 2006/0061008 A1 | 3/2006 | Kamer et al. |
| 2006/0076860 A1 | 4/2006 | Hoss |
| 2006/0139953 A1 | 6/2006 | Chou et al. |
| 2006/0187378 A1 | 8/2006 | Bong et al. |
| 2006/0279522 A1 | 12/2006 | Kurihara |
| 2007/0058257 A1 | 3/2007 | Lynam |
| 2007/0064108 A1 | 3/2007 | Haler |
| 2007/0080585 A1 | 4/2007 | Lyu |
| 2007/0183037 A1 | 8/2007 | De Boer et al. |
| 2007/0262732 A1 | 11/2007 | Shen |
| 2008/0030311 A1 | 2/2008 | Dayan et al. |
| 2008/0068520 A1 | 3/2008 | Minikey et al. |
| 2008/0231704 A1 | 9/2008 | Schofield et al. |
| 2008/0266389 A1 | 10/2008 | DeWind et al. |
| 2008/0316054 A1 | 12/2008 | Lynam et al. |
| 2009/0002491 A1 | 1/2009 | Haler |
| 2009/0040778 A1 | 2/2009 | Takayanagi et al. |
| 2009/0052003 A1 | 2/2009 | Schofield et al. |
| 2009/0085729 A1 | 4/2009 | Nakamura et al. |
| 2009/0096937 A1 | 4/2009 | Bauer et al. |
| 2009/0115631 A1 | 5/2009 | Foote et al. |
| 2009/0184904 A1 | 7/2009 | S et al. |
| 2009/0201137 A1 | 8/2009 | Weller et al. |
| 2009/0243824 A1 | 10/2009 | Peterson et al. |
| 2009/0262192 A1 | 10/2009 | Schofield et al. |
| 2009/0296190 A1 | 12/2009 | Anderson et al. |
| 2010/0026475 A1 | 2/2010 | Hwang |
| 2010/0045899 A1 | 2/2010 | Ockerse |
| 2010/0110523 A1 | 5/2010 | Varaprasad et al. |
| 2010/0110553 A1 | 5/2010 | Anderson et al. |
| 2010/0194890 A1 | 8/2010 | Weller et al. |
| 2010/0195226 A1 | 8/2010 | Heslin et al. |
| 2010/0201896 A1 | 8/2010 | Ostreko et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2010/0289995 A1 | 11/2010 | Hwang et al. |

FOREIGN PATENT DOCUMENTS

| | | |
|---|---|---|
| CN | 1189224 A | 7/1998 |
| CN | 2775680 Y | 4/2006 |
| CN | 200939857 Y | 8/2007 |
| CN | 201009817 Y | 1/2008 |
| DE | 941408 C | 4/1956 |
| DE | 944531 C | 7/1956 |
| DE | 7323996 U | 11/1973 |
| DE | 3248511 A1 | 7/1984 |
| DE | 3301945 A1 | 7/1984 |
| DE | 3614882 A1 | 11/1987 |
| DE | 3720848 A1 | 1/1989 |
| DE | 9306989.8 | 7/1993 |
| DE | 4329983 A1 | 3/1995 |
| DE | 4444443 A1 | 6/1996 |
| DE | 29703084 U1 | 4/1997 |
| DE | 29805142 U1 | 5/1998 |
| DE | 19741896 A1 | 4/1999 |
| DE | 29902344 U1 | 5/1999 |
| DE | 19755098 A1 | 7/1999 |
| DE | 19934999 A1 | 2/2001 |
| DE | 19943355 A1 | 3/2001 |
| DE | 20118868 U1 | 3/2002 |
| DE | 10054315 A1 | 5/2002 |
| DE | 10031459 A1 | 1/2003 |
| EP | 0299509 A2 | 1/1989 |
| EP | 0443185 A2 | 8/1991 |
| EP | 0513476 A1 | 11/1992 |
| EP | 0524766 A2 | 1/1993 |
| EP | 0728618 A2 | 8/1996 |
| EP | 0729864 A1 | 9/1996 |
| EP | 0825477 A2 | 2/1998 |
| EP | 0830985 A1 | 3/1998 |
| EP | 0899157 A1 | 3/1999 |
| EP | 0928723 A2 | 7/1999 |
| EP | 937601 A2 | 8/1999 |
| EP | 1075986 A1 | 2/2001 |
| EP | 1097848 A2 | 5/2001 |
| EP | 1152285 A2 | 11/2001 |
| EP | 1193773 A2 | 4/2002 |
| EP | 1256833 A2 | 11/2002 |
| EP | 1315639 A1 | 6/2003 |
| EP | 1652727 A1 | 5/2006 |
| FR | 1021987 A | 2/1953 |
| FR | 1461419 A | 2/1966 |
| FR | 2551005 | 3/1985 |
| FR | 2585991 A3 | 2/1987 |
| FR | 2672857 A1 | 8/1992 |
| FR | 2673499 A1 | 9/1992 |
| FR | 2759045 A1 | 8/1998 |
| GB | 810010 A | 3/1959 |
| GB | 934037 A | 8/1963 |
| GB | 1008411 A | 10/1965 |
| GB | 1136134 A | 12/1968 |
| GB | 1553376 A | 9/1979 |
| GB | 2137573 A | 10/1984 |
| GB | 2161440 A | 1/1986 |
| GB | 2192370 A | 1/1988 |
| GB | 2222991 A | 3/1990 |
| GB | 2255539 A | 11/1992 |
| GB | 2275329 A | 8/1994 |
| GB | 2351055 A | 12/2000 |
| GB | 2362494 A | 11/2001 |
| JP | 52-146988 | 11/1977 |
| JP | S5539843 A | 3/1980 |
| JP | 57208530 | 12/1982 |
| JP | 58-020954 | 2/1983 |
| JP | 58-030729 | 2/1983 |
| JP | S58110334 A | 6/1983 |
| JP | 58-180347 | 10/1983 |
| JP | 58209635 | 12/1983 |
| JP | 59114139 | 7/1984 |
| JP | 6080953 | 5/1985 |
| JP | 60212730 | 10/1985 |
| JP | 60261275 | 11/1985 |
| JP | 61-127186 | 6/1986 |
| JP | 61-260217 | 11/1986 |
| JP | 62043543 | 2/1987 |

(56) References Cited

FOREIGN PATENT DOCUMENTS

| | | |
|---|---|---|
| JP | 62-075619 | 4/1987 |
| JP | 62-131232 | 6/1987 |
| JP | 62122487 | 6/1987 |
| JP | 63-02753 B2 | 1/1988 |
| JP | 63-085525 | 4/1988 |
| JP | 63-106730 | 5/1988 |
| JP | 63-106731 | 5/1988 |
| JP | 63-274286 | 11/1988 |
| JP | 6414700 | 1/1989 |
| JP | 01-130578 | 5/1989 |
| JP | 01123587 | 5/1989 |
| JP | 02-122844 | 10/1990 |
| JP | 03-28947 | 3/1991 |
| JP | 03-052097 | 3/1991 |
| JP | 30-061192 | 3/1991 |
| JP | 03-110855 | 5/1991 |
| JP | 03-198026 | 8/1991 |
| JP | 03-243914 | 10/1991 |
| JP | 04114587 | 4/1992 |
| JP | 04245886 | 9/1992 |
| JP | 50000638 | 1/1993 |
| JP | 05-080716 | 4/1993 |
| JP | 05-183194 | 7/1993 |
| JP | 05213113 | 8/1993 |
| JP | 05-257142 | 10/1993 |
| JP | 6227318 B2 | 8/1994 |
| JP | 06-318734 | 11/1994 |
| JP | 07-146467 | 6/1995 |
| JP | 07-175035 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 08-227769 | 9/1996 |
| JP | 08268188 | 10/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 A | 5/2000 |
| JP | 2000-153736 A | 6/2000 |
| JP | 2000-159014 A | 6/2000 |
| JP | 2000-255321 A | 9/2000 |
| JP | 2000-330107 A | 11/2000 |
| JP | 2001-083509 A | 3/2001 |
| JP | 2001-222005 A | 8/2001 |
| JP | 2002-072901 A | 3/2002 |
| JP | 2002-122860 A | 4/2002 |
| JP | 2002120649 A | 4/2002 |
| JP | 2002-162626 A | 6/2002 |
| JP | 2002-352611 A | 12/2002 |
| JP | 2003-267129 A | 9/2003 |
| JP | 2004-182156 A | 7/2004 |
| JP | 2005-148119 A | 6/2005 |
| JP | 2005-327600 A | 11/2005 |
| JP | 38-46073 B2 | 11/2006 |
| JP | 2008-083657 A | 4/2008 |
| JP | 57-30639 B2 | 6/2015 |
| JP | 61-07035 B2 | 4/2017 |
| KR | 20060038856 A | 5/2006 |
| KR | 100663930 B1 | 1/2007 |
| WO | 1982/002448 | 7/1982 |
| WO | 1986/006179 | 10/1986 |
| WO | 1994019212 A2 | 9/1994 |
| WO | 1996021581 A1 | 7/1996 |
| WO | 1998014974 A1 | 4/1998 |
| WO | 1998/038547 | 9/1998 |
| WO | 1999/015360 | 4/1999 |
| WO | 2000/023826 A2 | 4/2000 |
| WO | 2000/052661 A1 | 9/2000 |
| WO | 2000/055685 A1 | 9/2000 |
| WO | 2001001192 A1 | 1/2001 |
| WO | 2002/018174 A1 | 3/2002 |
| WO | 2002/049881 A1 | 6/2002 |
| WO | 2003/021343 A1 | 3/2003 |
| WO | 2003/078941 A2 | 9/2003 |
| WO | 2006124682 A2 | 11/2006 |
| WO | 2007005942 A2 | 1/2007 |

OTHER PUBLICATIONS

Edgar, Julian; Goodbye 12 Volts . . . Hello 42 Volts!; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

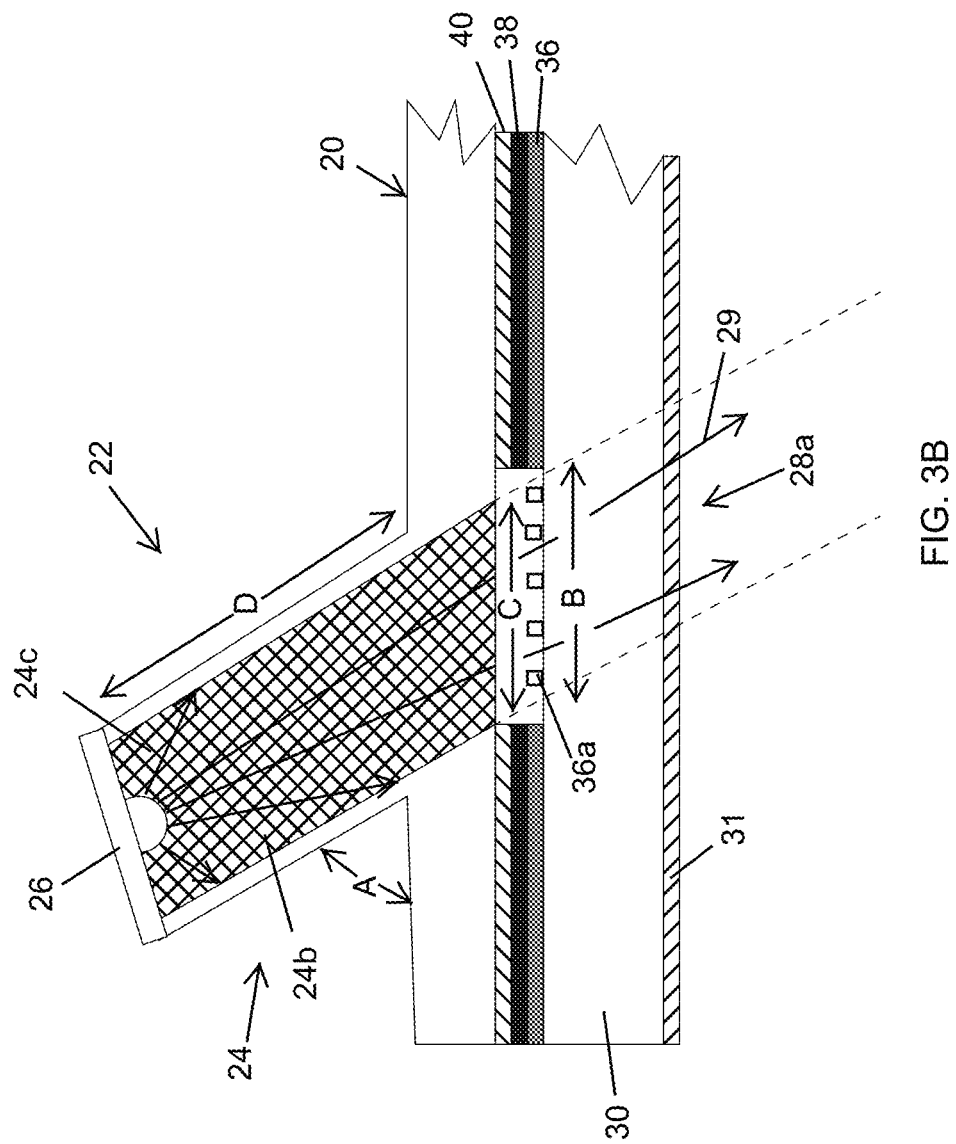

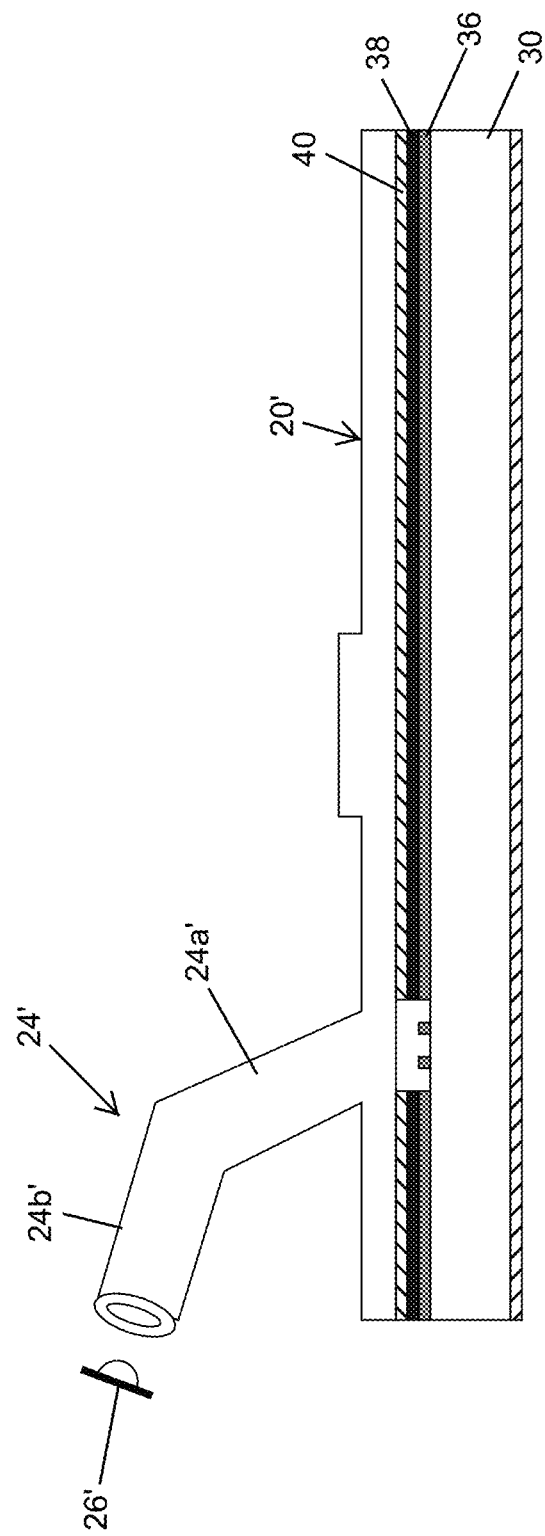

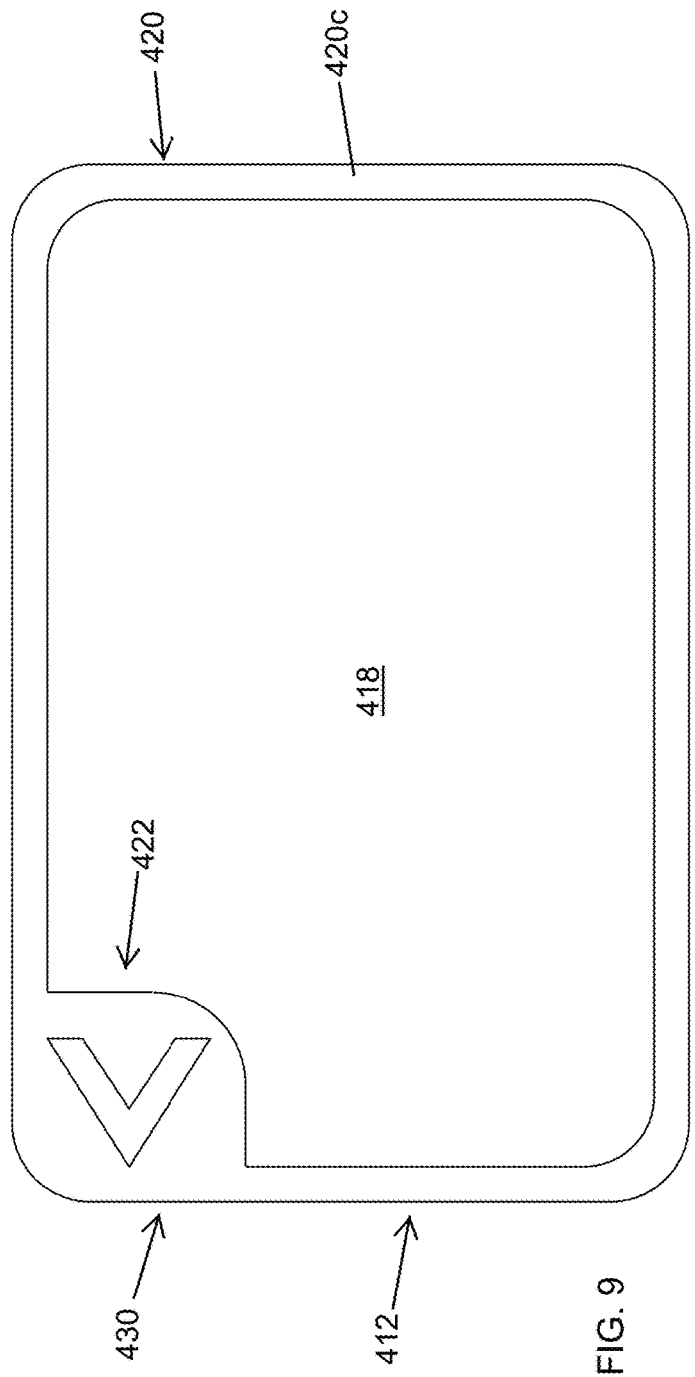
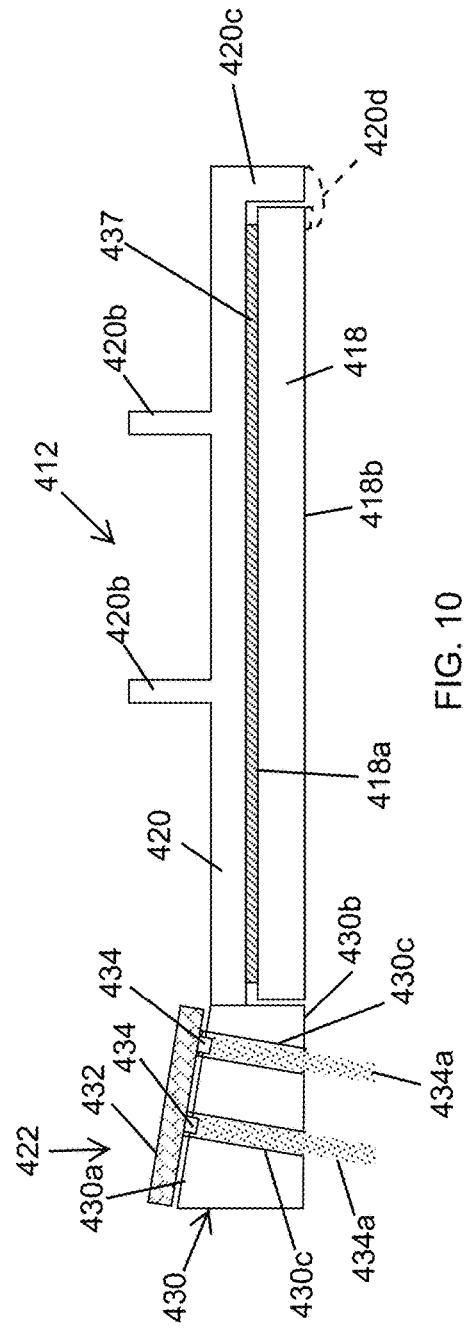

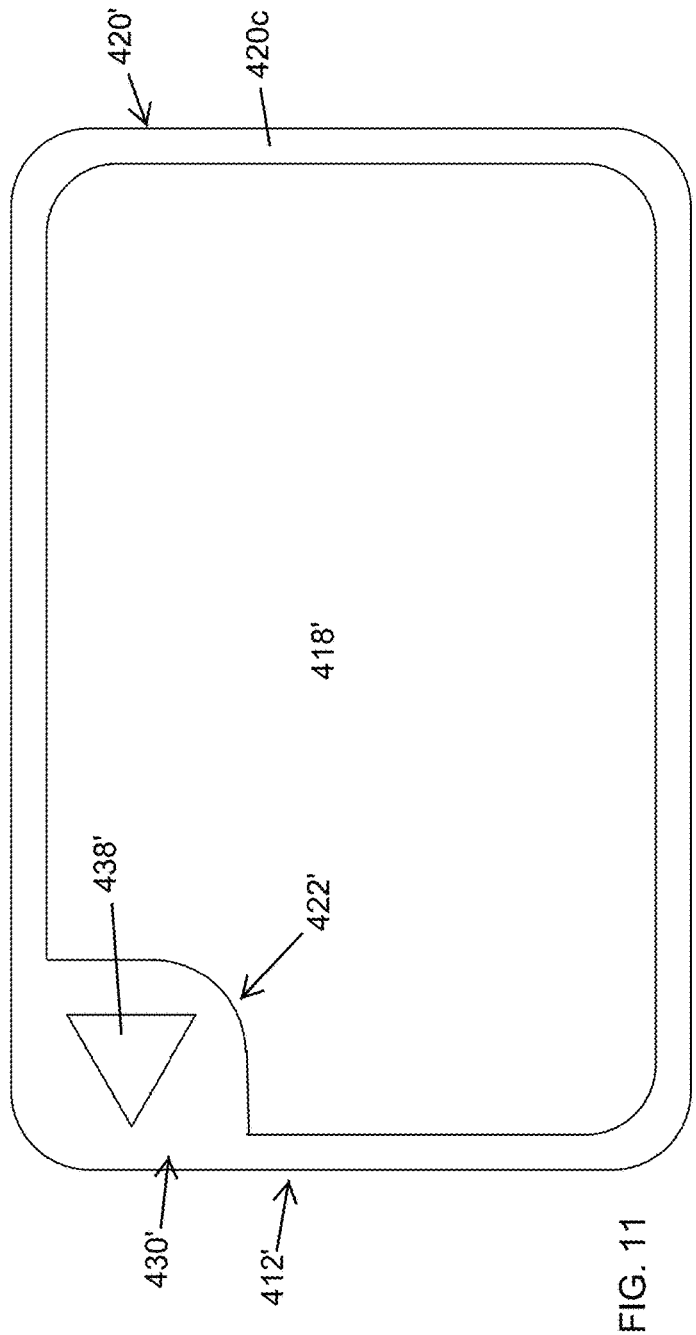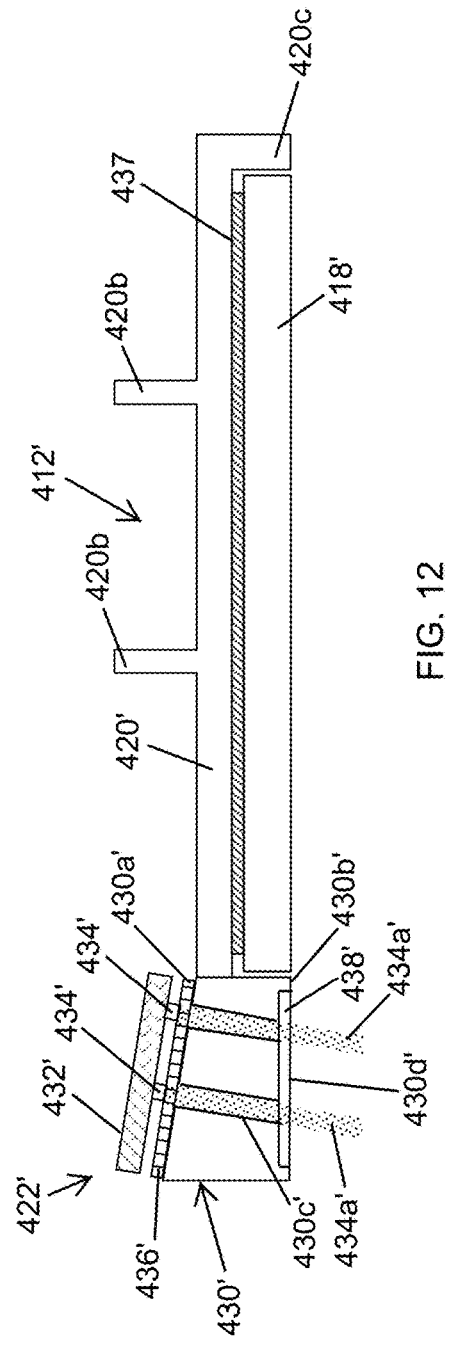

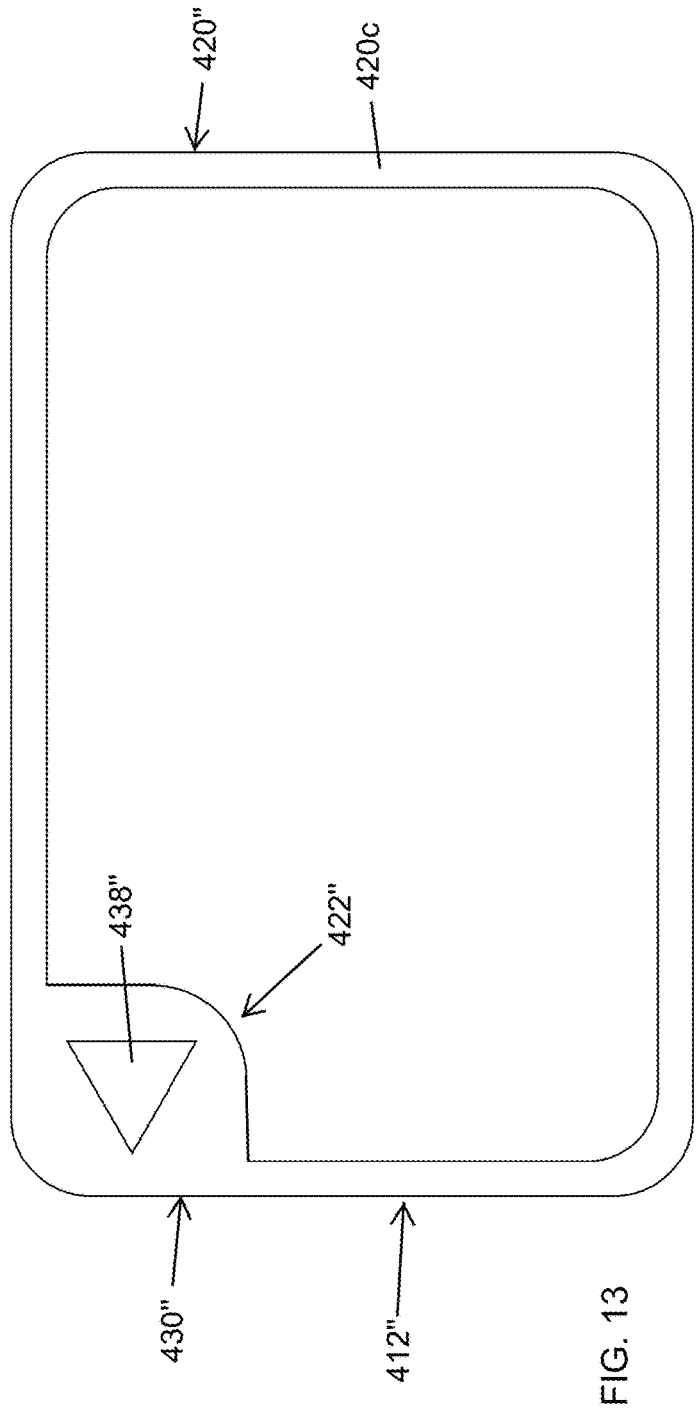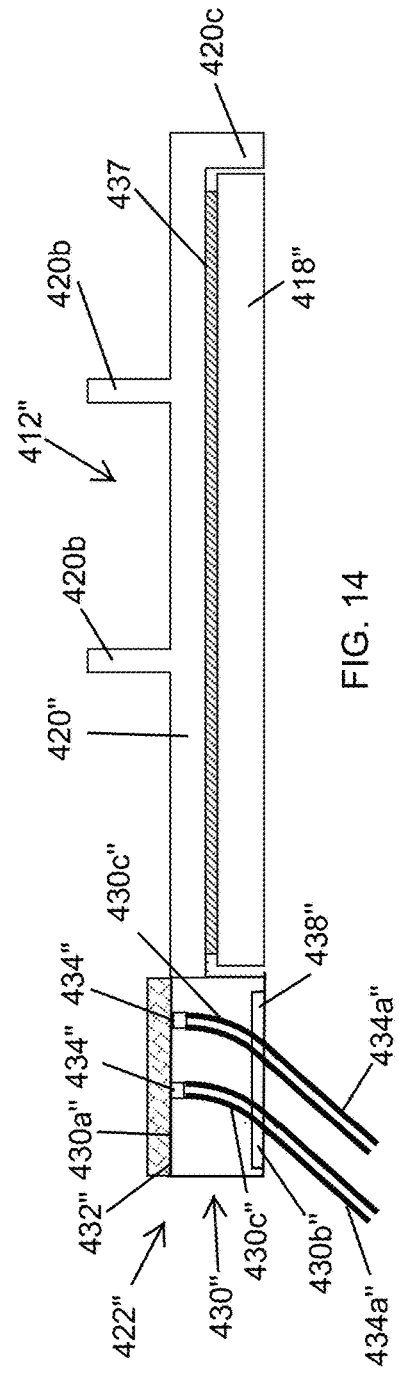

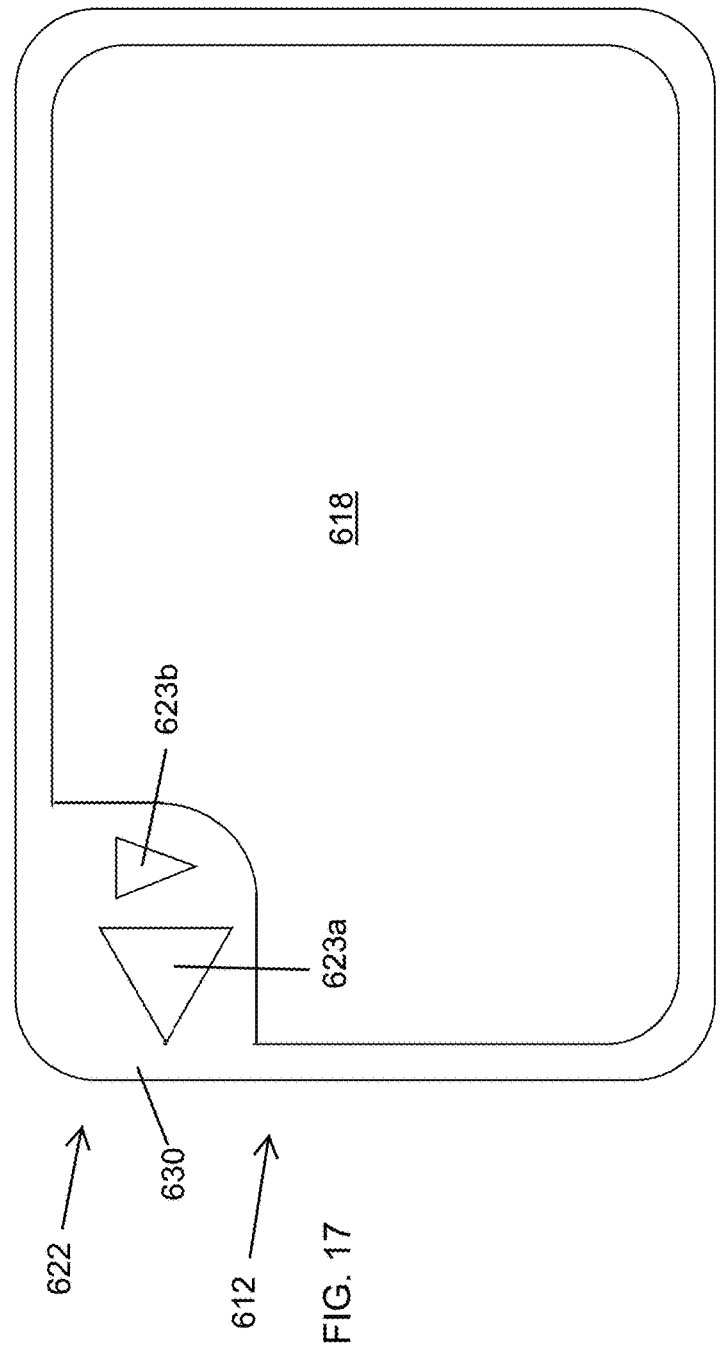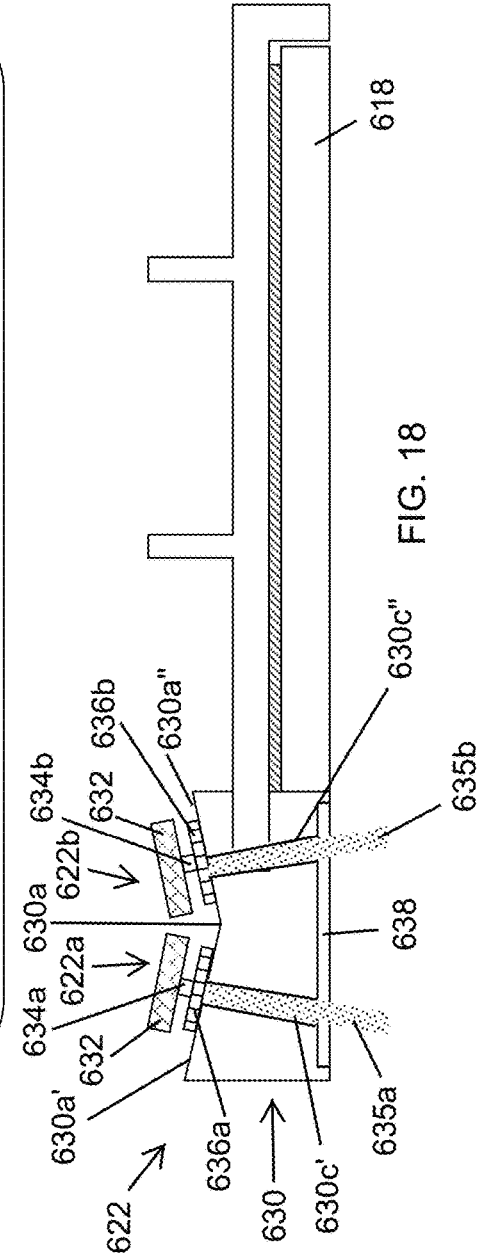

VEHICULAR EXTERIOR REARVIEW MIRROR ASSEMBLY WITH BLIND SPOT INDICATOR ELEMENT

CROSS REFERENCE TO RELATED APPLICATIONS

The present application is a continuation of U.S. patent application Ser. No. 16/429,166, filed Jun. 3, 2019, now U.S. Pat. No. 10,829,053, which is a continuation of U.S. patent application Ser. No. 16/214,294, filed Dec. 10, 2018, now U.S. Pat. No. 10,308,186, which is a continuation of U.S. patent application Ser. No. 15/700,270, filed Sep. 11, 2017, now U.S. Pat. No. 10,150,417, which is a continuation of U.S. patent application Ser. No. 15/638,663, filed Jun. 30, 2017, now U.S. Pat. No. 9,758,102, which is a continuation of U.S. patent application Ser. No. 14/726,907, filed Jun. 1, 2015, now U.S. Pat. No. 9,694,753, which is a continuation of U.S. patent application Ser. No. 14/486,133, filed Sep. 15, 2014, now U.S. Pat. No. 9,045,091, which is a continuation of U.S. patent application Ser. No. 13/646,960, filed Oct. 8, 2012, now U.S. Pat. No. 8,833,987, which is a continuation of U.S. patent application Ser. No. 13/335,135, filed Dec. 22, 2011, now U.S. Pat. No. 8,282,253, which is a continuation of U.S. patent application Ser. No. 12/550,054, filed Aug. 28, 2009, now U.S. Pat. No. 8,083,386, which is a continuation of U.S. patent application Ser. No. 11/520,193, filed Sep. 13, 2006, now U.S. Pat. No. 7,581,859, which claims the benefit of U.S. provisional application Ser. No. 60/717,093, filed Sep. 14, 2005, which is hereby incorporated herein by reference in its entirety.

FIELD OF THE INVENTION

The present invention relates to exterior rearview mirror assemblies and, more particularly, to an exterior rearview mirror assembly having a blind spot/object detection indicator and/or a lane change aid (LCA) indicator and/or a turn signal or indicator at the exterior rearview mirror assembly.

BACKGROUND OF THE INVENTION

It is known to provide an object in a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such an object in a blind spot detection/LCA system often includes a visual indicator that visually indicates the detection of another vehicle or object to the driver of the host vehicle. It is also know to provide a turn signal indicator that is activated when a turn signal is activated by the driver of the host vehicle so as to provide an indication of the vehicle turning or changing lanes to the driver of a vehicle in an adjacent lane to the host or subject vehicle or to another person external to the host or subject vehicle. The visual indicator or indicators (commonly a light emitting diode or the like) of such systems is/are often located at the mirror reflective element of the exterior rearview mirror assembly.

The object/LCA visual indicator or indicators indicate or alert the driver of the host vehicle of the presence or impending presence of another vehicle or object in a blind spot in an adjacent side lane that typically cannot be readily seen within the field of view of the exterior mirror reflective element of the exterior mirror assembly mounted at that side of the vehicle and/or cannot be readily seen by the driver's peripheral vision or the like. The object/LCA visual indicators typically are arranged to be viewable principally or solely by the driver of the host vehicle and not by drivers of other vehicles. Similarly, the turn signal visual indicator or indicators indicate or alert a person external of the host vehicle (such as the driver of another vehicle alongside or approaching the host vehicle) that the turn signal of the host vehicle is activated to indicate that the driver of the host vehicle is contemplating or commencing a turn or lane change or the like. It is desirable that such turn signal visual indicators are not readily viewable by the driver of the host vehicle when they are activated. Because of vehicle regulations and mirror and vehicle configurations and geometries, and because of the need to provide an uninterrupted reflective surface to satisfy the likes of the FMVSS 111 field of view regulation, blind spot/LCA indicators in the prior art are typically located towards or at the outboard edge, and typically towards or at the upper corner/quadrant, of the reflective mirror element of the exterior mirror assembly.

Somewhat costly and complicated indicator constructions have been contemplated that, when placed behind and supported by the mirror reflective element, attempt to have their projected beam of emitted light directed principally to be viewed by the driver of the host vehicle (or other person external to the host vehicle for turn signal applications) through the mirror reflective element and shielded from view by other drivers (or from the driver of the host vehicle for turn signal applications). In some applications, the mirror reflective element may have a transflective reflector coating or may have a window or port formed in a non-transflective reflector coating. For example, transflective mirror coatings (such as, for example, those described in U.S. Pat. Nos. 3,280,701; 6,855,431; 5,724,187; 5,340,503; 6,286,965; 6,196,688; 5,535,056; 5,751,489 and 6,065,840, which are hereby incorporated herein by reference in their entireties) may be used, or alternately, a transmissive window or port may be formed in the reflective coating or coatings of the mirror reflective element. An illumination source or indicator may be positioned so as to direct or emit illumination through the window or display area and toward the driver of the host vehicle so as to be viewable by the driver of the host vehicle (or outwardly away from the vehicle so as to be generally not viewable by the driver of the host vehicle for turn signal applications).

Such a mirror assembly and indicator often include a baffle or other light directing element and an illumination source positioned at the rear of the mirror reflective element (and generally at the transmissive window or port if applicable). The baffle or light directing element directs the light or illumination from the illumination source toward the desired or appropriate viewer (such as the driver of the host vehicle for blind spot/LCA applications or the driver of another vehicle for turn signal applications) and away from others (such as away from other drivers for blind spot/LCA applications or away from the driver of the host vehicle for turn signal applications).

Typically, such baffles or light directing elements are adhered to the rear surface of the mirror reflective element. In some applications, the illumination source may be provided as a module to the mirror assembly facility and adhered to the rear of the mirror reflective element as a unit or module (for instance, light from LEDs facing and emitting light in the direction away from the mirror element may be reflected back towards the mirror reflector, and hence through the mirror element, using suitably angled or disposed mirrored surfaces). After the baffle or module is attached to the reflective element, the back plate of the mirror assembly may be adhered to the mirror reflective element to complete the mirror reflector sub assembly that is then assembled with the actuator and casing and other components to form the complete mirror assembly for mounting to the side of the vehicle.

A variety of interior and exterior mirror assemblies with indicators are known in the art, such as U.S. Pat. Nos. 5,788,357; 6,257,746; 6,005,724; 5,481,409; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,938,320; 6,700,692 and 5,786,772, Canadian Pat. No. CA 1,063,695, Pat. Abstracts of Japan Publication No. 0917573, published Jul. 8, 1997, which are all hereby incorporated herein by reference in their entireties.

Therefore, there is a need in the art for an improved object in a blind spot/LCA indicator that is readily viewable by a driver of the host vehicle and not visible or viewable by a driver of another vehicle and/or an improved turn signal indicator that is readily viewable by the driver of another vehicle and not visible or viewable by the driver of the host vehicle.

SUMMARY OF THE INVENTION

The present invention provides an object in a blind spot indicator or lane change assist (LCA) indicator or turn signal indicator or other indicator that is integral with the mirror reflector carrier or back plate of the mirror reflector sub-assembly so as to be positioned at and attached to the mirror reflective element as the back plate is adhered or otherwise attached at the back of the mirror reflective element. Preferably, the signal indicator is provided as a sealed or substantially sealed unit or module that can be snapped into or otherwise attached or secured (preferably mechanically but optionally adhesively) at the mirror back plate, preferably at the mirror sub-assembly manufacturing operation when the mirror reflective element (and any associated heater or other item or element) is joined to the mirror back plate. The present invention thus provides a mirror reflector carrier or back plate with an integrated blind spot indicator/indicators and/or turn signal indicator/indicators and/or other indicator/indicators.

According to an aspect of the present invention, an exterior rearview mirror assembly for a vehicle includes a mirror reflective element, a back plate and an indicator or display device. The back plate is attached to the rear surface of the reflective element (the surface opposite the front surface, with the front surface facing generally rearward and toward the driver of the vehicle when the mirror assembly is mounted to the vehicle) and includes an indicator mount or mounting portion for mounting the indicator at the back plate. The indicator mounting portion extends rearward away from the reflective element and may be integrally formed with the back plate, preferably by injection molding. The indicator mounting portion is formed at an acute angle relative to the rear surface of the back plate and is generally hollow so as to provide a passageway therealong. The indicator is mounted at the indicator mounting portion and is activatable so that illumination from the indicator is directed along the angled indicator mounting portion and is thus viewable through the reflective element by a person viewing the mirror reflective element at a desired or generally corresponding angle.

The back plate may comprise a plastic molding, such as a plastic molding formed by injection molding or co-injection molding or the like. The back plate may be formed with an attaching portion, such as a raised annular ring or annular prongs or annular snaps or the like at its rear surface (opposite from the mounting face or surface that attaches to the mirror reflective element) for attaching the back plate to a mirror actuator (for manually or electrically adjusting an angle of the mirror reflective element relative to the mirror casing).

According to another aspect of the present invention, a mirror reflective element sub-assembly for an exterior rearview mirror assembly of a vehicle includes a mirror reflective element, a mirror back plate attached at a rear surface of the mirror reflective element, and a display element having a light source that is activatable to emit light. The mirror back plate is formed by injection molding and has a display receiving portion established thereat. The display element attaches to the display receiving portion of the mirror back plate and the light source is activatable to emit light through the display receiving portion. The mirror back plate and the display receiving portion are configured to orient the display element at a predetermined angle so that light exiting the display element when the light source is activated is directed one of (a) generally away from the vehicle when the mirror assembly is mounted to the vehicle so as to be principally viewed by drivers of other vehicles and so as to be substantially not viewed by the driver of the host vehicle, and (b) generally toward the driver of the vehicle when the mirror assembly is mounted to the vehicle so as to be principally viewed by the driver of the host vehicle and so as to be substantially not viewed by drivers of other vehicles.

Optionally, the light emanating from the display element when the light source is activated passes through the reflective element before exiting the mirror reflective element sub-assembly. Optionally, the light emanating from the display element when the light source is activated does not pass through the reflective element before exiting the mirror reflective element sub-assembly. The light emanating from the display element when the light source is activated thus may be directed through the display receiving portion at a location separate from the reflective element.

The display receiving portion may include at least one passageway therethrough, with the emitted light being directed through the passageway or passageways. A cover element may be disposed at a forward surface of the display receiving portion, so as to at least partially cover and preferably substantially seal the passageway or passageways of the display receiving portion.

Optionally, the display element is associated with a blind spot detection system of the vehicle. Optionally, the display element is associated with a turn signal of the vehicle. Optionally, the display element may comprise first and second display elements, with a first display element being associated with a turn signal of the vehicle and a second display element being associated with a blind spot detection system of the vehicle.

Therefore, the present invention provides a display device or indicator at the back plate of a mirror reflector sub-assembly. The mirror reflector sub-assembly thus may achieve enhanced assembly processes, and may be supplied or provided to a mirror manufacturer or assembler as a unit that includes the indicator mounting portion (and that may also include the indicator) and display. The integrally formed back plate and indicator mount or mounting portion may be readily attached to the mirror reflective element, and the indicator may be readily plugged into or connected to or received in the indicator mount to assemble the mirror reflector sub-assembly. The back plate may include one or more indicator mounts or mounting portions for providing one or more displays at the reflective element, such as a blind spot/LCA display and/or a turn signal display and/or the like.

These and other objects, advantages, purposes and features of the present invention will become apparent upon review of the following specification in conjunction with the drawings.

BRIEF DESCRIPTION OF THE DRAWINGS

FIG. 3B is an enlarged sectional view of the indicator mounting portion and display area of the mirror reflector sub-assembly of FIG. 3A;

FIG. 4 is a partial sectional view of a portion of another mirror reflector sub-assembly of the present invention;

FIG. 9 is a view of another exterior mirror reflector sub-assembly with a display device or indicator in accordance with the present invention, shown as viewed in the direction of travel of the vehicle;

FIG. 10 is a sectional view of the mirror reflector sub-assembly of FIG. 9;

FIG. 11 is a view of another exterior mirror reflector sub-assembly with another display device or indicator in accordance with the present invention, shown as viewed in the direction of travel of the vehicle;

FIG. 12 is a sectional view of the mirror reflector sub-assembly of FIG. 11;

FIG. 13 is a view of another exterior mirror reflector sub-assembly with another display device or indicator in accordance with the present invention, shown as viewed in the direction of travel of the vehicle;

FIG. 14 is a sectional view of the mirror reflector sub-assembly of FIG. 13;

FIG. 17 is a view of another exterior mirror assembly with a display device or indicator in accordance with the present invention, shown as viewed in the direction of travel of the vehicle; and FIG. 18 is a sectional view of the mirror reflector sub-assembly of FIG. 17.

DESCRIPTION OF THE PREFERRED EMBODIMENTS

Figure 1:
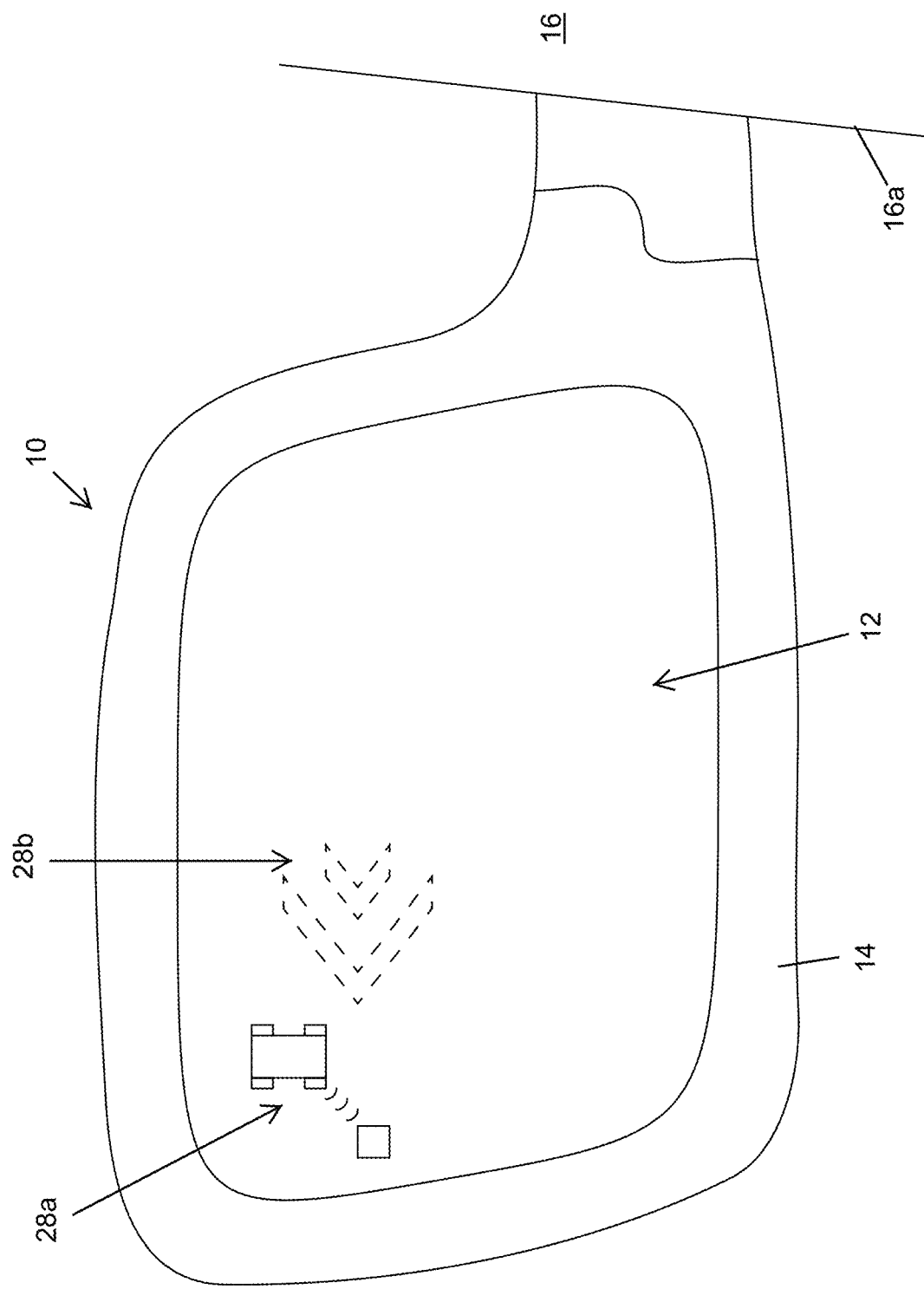
FIG. 1 is a view of an exterior mirror assembly with a display device or indicator in accordance with the present invention, shown as viewed in the direction of travel of the vehicle.
Figure 2:
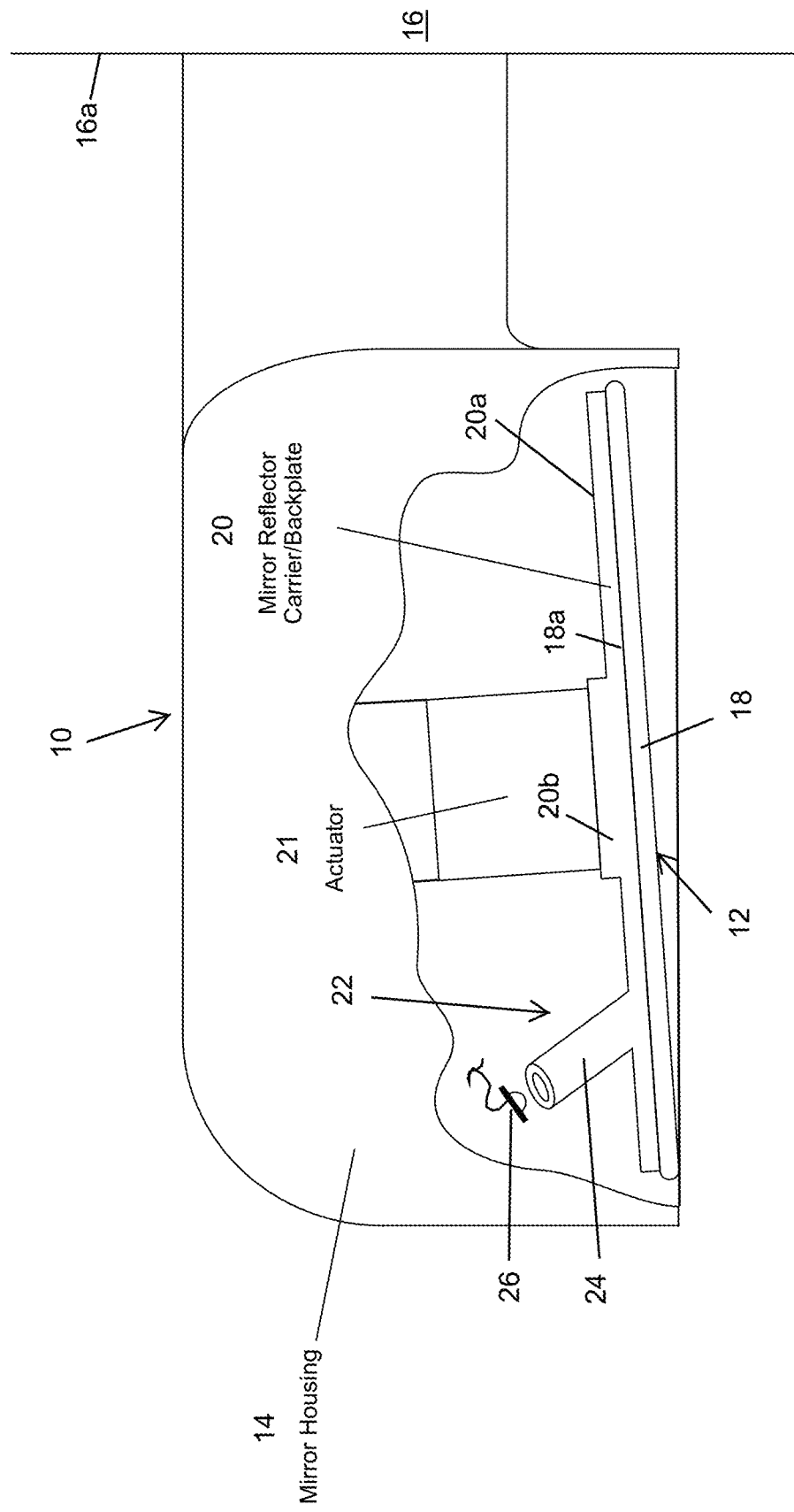
FIG. 2 is a top plan view of the mirror assembly of FIG. 1 with a portion of the casing cut away to show additional details.

Referring now to the drawings and the illustrative embodiments depicted therein, an exterior rearview mirror assembly 10 for a vehicle includes a mirror reflector sub-assembly 12 and a mirror shell or casing 14 (FIG. 1). Mirror assembly 10 is mounted at the side 16a of a host or subject vehicle 16. As shown in FIG. 2, mirror reflector sub-assembly 12 includes a mirror reflective element 18 and a mirror reflector carrier or back plate 20 attached to or mounted to or adhered to a rear surface 18a of mirror reflective element 18. Mirror assembly 10 includes a display element or device 22 that is operable to provide a display or indication at the reflective element for viewing the display or indication through the mirror reflective element. Display device 22 includes a generally hollow indicator mounting portion or indicator receiving portion or extension or tube 24 (that extends rearwardly from a rear surface 20a of back plate 20 so as to extend generally away from the mirror reflective element 18) and an illumination source or indicator 26, which is attached to or mounted to or received in or at the indicator mounting portion 24. In the illustrated embodiment of FIG. 2, the mirror assembly includes a display device 22 for an object in a blind spot detection system or LCA system, as discussed below, but could also or otherwise include a display device for a turn signal indicator or other indicator device (as discussed below).

Optionally, the mirror assembly may include multiple display elements or devices (such as two or more display elements or devices) for providing both an object in a blind spot/LCA indicator and display area 28a and a turn signal indicator and display area 28b, such as shown in FIG. 1 and such as discussed below with respect to FIG. 6. The two or more display devices may be incorporated together into a single unitary display module or unit (and thus with a common connector incorporated in the single unitary module and servicing, for example, a commonly housed turn signal indicator element and blind spot indicator element), or the two or more display devices may be separate display devices (for example, a LCA blind spot indicator unitary module may be disposed at a bottom/lower inward portion of the mirror sub-assembly and a separate turn signal indicator unitary module may be disposed at an upper outward portion of the mirror sub-assembly), while remaining within the spirit and scope of the present invention. Optionally, for example, a turn signal indicator or device or element or module of the present invention may be incorporated into a mirror sub-assembly, and the exterior rearview mirror assembly may include a blind spot or lane change assist indicating device or element at a portion of the mirror casing (such as at an inboard facing portion of the casing), such as by utilizing aspects of the indicating elements described in PCT Application No. PCT/US2006/026148, filed Jul. 5, 2006 and published on Jan. 11, 2007 as International Publication No. WO 2007/005942, which is hereby incorporated herein by reference in its entirety.

Indicator mounting portion 24 is unitarily or integrally formed with back plate 20 and is formed at an acute angle relative to the generally planar rear surface 20a of back plate 20. Indicator 26 is operable or activatable or energizable to provide illumination at and through or along the indicator mounting portion 24, whereby the illumination is viewable through mirror reflective element 18 by a person viewing the mirror assembly 10. The display device 18 may comprise a blind spot or object detection indicating device that is operable to indicate to the driver of the subject or host vehicle that an object or other vehicle is detected at the side or blind spot region of the host vehicle by a blind spot detection system (or may comprise a turn signal indicating device that is operable to indicate to the driver or passenger of another vehicle that the vehicle is turning or changing lanes, or may comprise other forms or types of display or illumination or indicating devices, as discussed below).

Back plate 20 includes an attachment portion 20b (such as an annular ring or tab or annular prongs or annular snaps or the like) for attaching the back plate to an actuator 21, which is adjustable or operable to adjust a viewing angle of mirror reflective element 18. As can be seen in FIG. 2, when the mirror reflective element is canted or angled partially toward the driver of the host vehicle (which is typically the orientation of the reflective element during use so as to provide a generally rearward field of view to the driver of the host vehicle), there is sufficient space within the mirror casing at or near the outboard portion of the mirror assembly for the indicator mounting portion. The back plate and display device of the present invention thus utilizes the space within the mirror head or casing that is already available and typically not used or occupied by other components.

Figure 3:
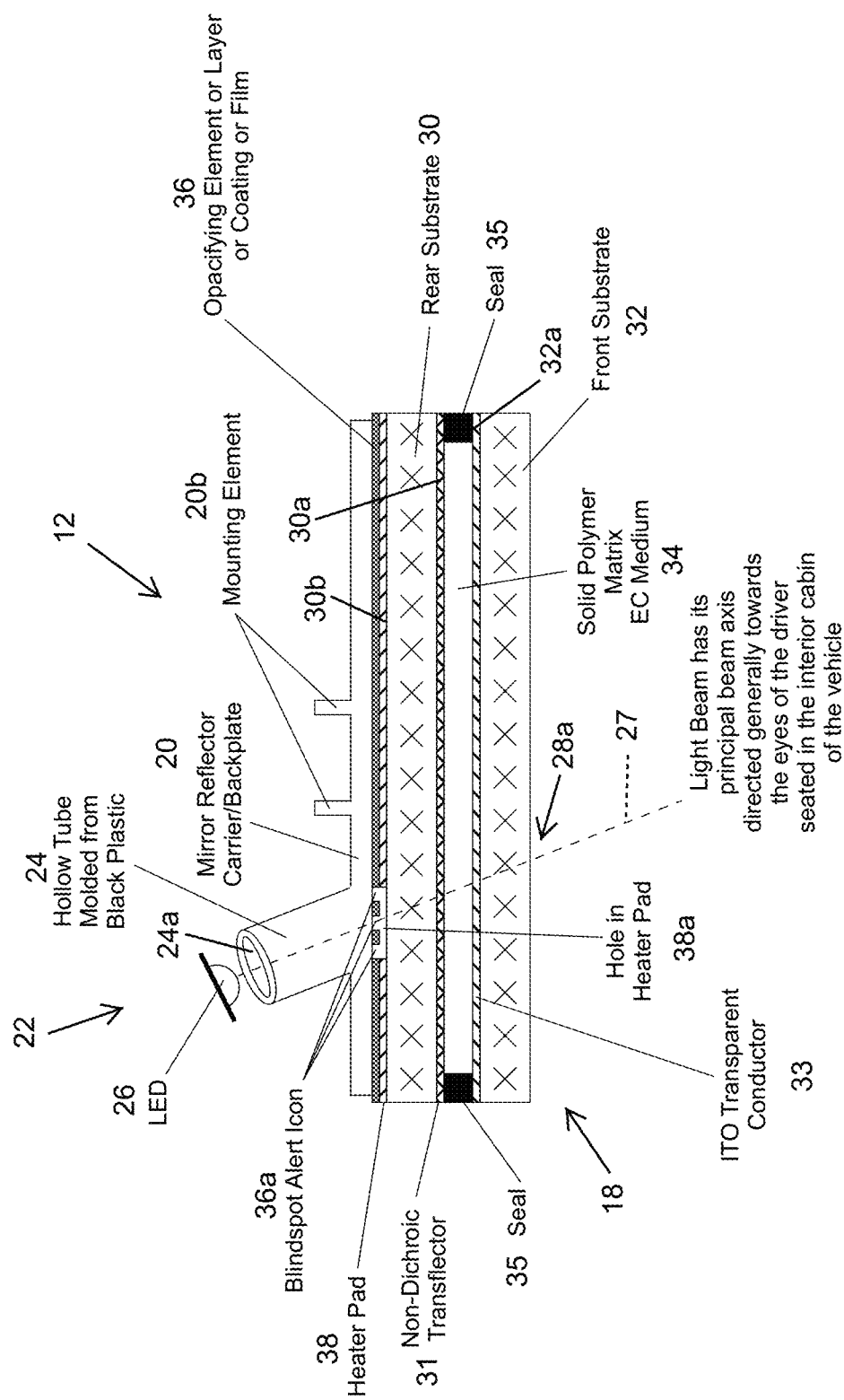
FIG. 3 is a partial sectional view of a mirror reflector sub-assembly having a back plate and display device in accordance with the present invention.

Indicator 26 may include an illumination or light source (such as one or more light emitting diodes (LEDs) or organic light emitting diodes (OLEDs) or the like) that is/are energized to direct or emit illumination through and along indicator mounting portion 24 so that the illumination is viewable through the reflective element. The mirror reflective element may include one or more iconistic display areas (such as the single display area 28a shown in FIG. 3 or the two display areas 28a and 28b shown in FIG. 1) so that the illumination is viewable and discernible at the reflective element by the desired or targeted viewer, depending on the angle of the indicator mounting portion 24. The mirror assembly thus may provide an iconistic display for an object detection/LCA system and/or an iconistic display for a turn signal indication, and/or may provide other displays or illumination devices, without affecting the scope of the present invention. As shown in FIG. 3, the indicator mounting portion may be angled so as to direct the light toward the vehicle and toward a driver or occupant of the host vehicle. More particularly, the light beam emitted from the indicator 26 and transmitted through the reflective element is angled so as to have its principle beam axis 27 directed generally toward the eyes of a driver seated in the interior cabin of the host vehicle.

The indicator may be activated or energized in response to a detection of an object or other vehicle approaching or adjacent to the host vehicle in order to alert or warn the driver of the host vehicle not to attempt or initiate a lane change that moves the subject or host vehicle into the already occupied (or soon to be occupied) side lane or region adjacent either the driver side or the passenger side of the host vehicle. As shown in FIG. 1, display area 28a may be for displaying or indicating to the driver of the host vehicle that an object has been detected in the blind spot, while the display area 28b may be for displaying or indicating a turn signal activation to the driver of another vehicle. In the illustrated embodiment, display area 28a comprises an ISO icon (showing icons representing the host vehicle and another vehicle at the side and/or rearward of the host vehicle) to indicate to the driver of the host vehicle that another vehicle has been detected at the side and/or rearward of the host vehicle.

Optionally, however, the display area may comprise other forms, such as, for example, a multi-stage indicator having multiple indicating portions or elements or devices for indicating a degree of hazard or the like of an object or vehicle detected alongside and/or rearward of the host vehicle (such as an indicating display of the types described in PCT Application No. PCT/US2006/026148, filed Jul. 5, 2006 and published Jan. 11, 2007 as International Publication No. WO 2007/005942; and U.S. provisional applications, Ser. No. 60/696,953, filed Jul. 6, 2005, and Ser. No. 60/784,570, filed Mar. 22, 2006, which are hereby incorporated herein by reference in their entireties), or other types of indicating means, without affecting the scope of the present invention.

In the illustrated embodiment, and as shown in FIG. 3, mirror reflective element 18 comprises an electro-optic (such as electrochromic) reflective element that includes a rear substrate 30 (such as a glass substrate) with a transflective coating or layer 31 (such as a non-dichroic transflector or the like and/or such as utilizing aspects of the transflective reflective elements described below) on its front or forward surface 30a, a front substrate 32 with a transparent conductive coating 33 (such as an indium tin oxide (ITO) or the like) on its rear surface 32a, and an electro-optic medium 34 disposed between the front substrate 32 and rear substrate 30 and contained therebetween via a perimeter seal 35, such as by utilizing aspects of electro-optic or electrochromic reflective elements or cells as discussed below. A dark or opacifying element or layer or coating or film 36 (such as black or dark color, such as dark blue or dark grey, paint or ink or film or coating or tape or lacquer or the like, and preferably a dark, light-absorbing layer that is printed or screened onto the fourth or rear surface of the electrochromic reflective element or cell) is disposed or established on a rear surface 30b of rear substrate 30 of reflective element 18. The dark layer may be established via any suitable establishing methods or means, such as painting, printing, ink jet printing, pad printing, screening or the like.

The icons or pattern that define the display may be established at the rear of the rear substrate 30 and between the rear surface 30b of substrate 30 and the back plate 20. As can be seen with reference to FIGS. 3, 3A and 3B, the icons or pattern that define the display may be established through or defined by the dark layer 36 so that icons or iconistic portions 36a of the dark layer 36 form the icon or icons of the iconistic display area 28a. Optionally, the iconistic portions of the display area may be established by etching the dark layer or by a mask or the like positioned at the rear surface of the substrate during the painting or screening or coating process that applies the dark layer. Optionally, the iconistic portions of the display area may be established by etching or masking at a fourth surface conductive busbar or coating (such as a fourth surface conductive busbar of the types described in U.S. patent application Ser. No. 11/021,065, filed Dec. 23, 2004, now U.S. Pat. No. 7,255,451; and/or Ser. No. 11/334,139, filed Jan. 18, 2006, now U.S. Pat. No. 7,400,435; and/or U.S. provisional applications, Ser. No. 60/644,903, filed Jan. 19, 2005; and Ser. No. 60/667,049, filed Mar. 31, 2005, which are hereby incorporated herein by reference). Optionally, the icons or pattern may be established via cutouts or holes or patterns or indicia portions formed in and through or partially through a heater pad (that may be attached to or adhered to the dark or opacifying layer at the rear surface of the reflective element, as discussed below), with the dark layer having an opening or aperture formed therethrough and generally corresponding with the indicia portions of the heater pad when the heater pad is adhered to the dark layer at the rear surface of the reflective element.

Figure 3A:
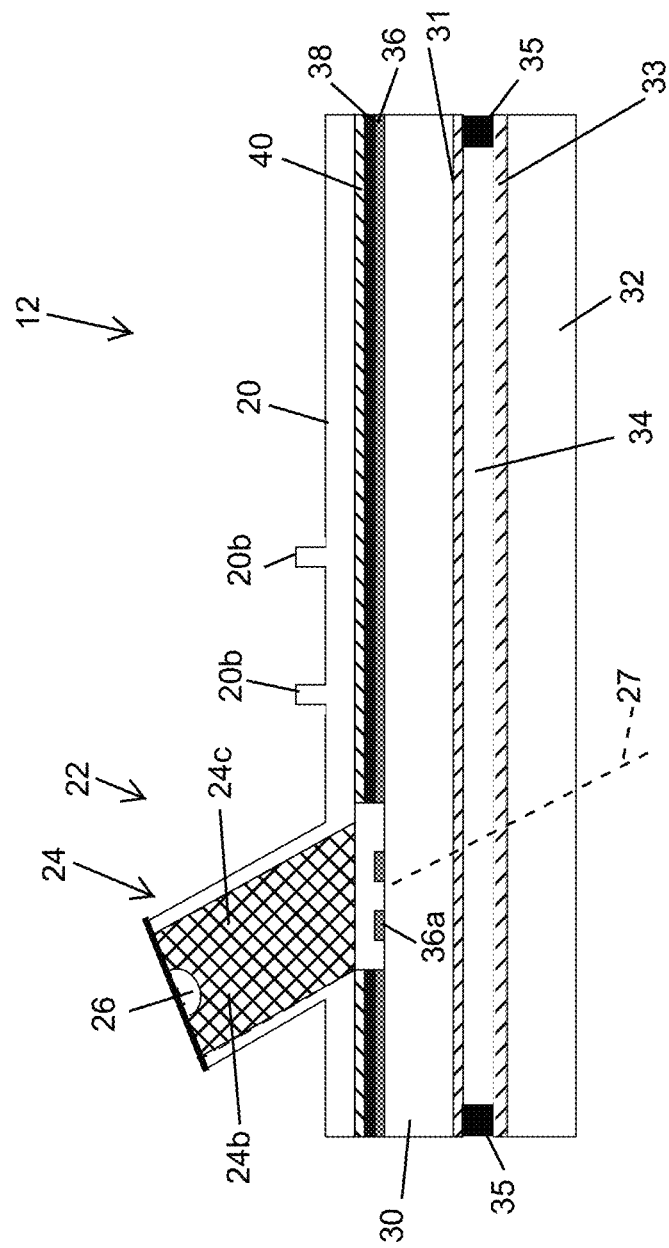
FIG. 3A is a sectional view of the mirror reflector sub-assembly having a back plate and display device in accordance with the present invention.

In the illustrated embodiment, mirror reflector sub-assembly 12 includes a heater pad 38 adhered or applied at the rear surface 30b of rear substrate 30 of reflective element 18, such as over the dark or opacifying element or layer 36 as shown in FIGS. 3, 3A and 3B. The heater pad 38 includes a hole or opening or aperture 38a therethrough that generally corresponds to the iconistic portions 36a when the heater pad 38 is attached to the opacifying layer 36 at the rear surface 30b of reflective element 18. As shown in FIGS. 3A and 3B, the heater pad 38 may include an adhesive layer 40 (such as a pressure sensitive adhesive layer) at its rear surface for adhering the back plate 20 to the heater pad 38 and thus to the rear surface 30b of the reflective element 18.

In the illustrated embodiment of FIGS. 3, 3A and 3B, back plate 20 is adhered to heater pad 38 such that indicator mounting portion 24 is positioned or located generally at the aperture 38a of heater pad 38 and the portions 36a of dark layer 36 so as to be generally at the display area 28a of the reflective element. Indicator mounting portion 24 is generally hollow and includes or provides a passageway 24a therethrough or therealong, whereby illumination source or indicator 26 is mounted at or positioned at the outer or rearward end of indicator mounting portion 24 and at or at partially in passageway 24a. Indicator mounting portion 24 is preferably molded of a plastic material, such as a dark or black plastic or polymeric material, and is preferably molded or formed when molding/forming the back plate 20.

Indicator 26 may snap into or may be threaded into the end of the indicator mounting portion 24 or may otherwise be attached or stuck at the end of the indicator mounting portion, and may have a gasket or seal at the indicator to provide a substantially water proof or water resistant or water tight seal at the indicator, whereby the indicator may be sealed at the indicator mounting portion, such as by gluing or pressing or screwing or gasketing or hermetically sealing or otherwise substantially sealing the indicator at the indicator mounting portion. The indicator may comprise a self-contained, unitary, sealed or substantially sealed, indicator module that includes an illumination source (such as one or more LEDs or the like), a DC converter with a voltage dropping resistor (such as described in U.S. Pat. Nos. 6,902,284 and 6,690,268 and/or U.S. patent application Ser. No. 10/054,633, filed Jan. 22, 2002, now U.S. Pat. No. 7,195,381, which are hereby incorporated herein by reference in their entireties). The module thus may be connected to a power source and may be activated or energized to illuminate the display for viewing by the driver of the vehicle. Optionally, the electrical connections to the indicator or indicator module may be made while the indicator module is attached to the mirror assembly, such as via a plug and socket type arrangement or configuration, and such as by utilizing aspects of the mirror assembly described in U.S. Pat. No. 6,669,267, which is hereby incorporated herein by reference in its entirety. The unitary indicator module may include or utilize aspects of various light modules or systems or devices, such as the types described in U.S. Pat. Nos. 6,227,689; 6,582,109; 5,371,659; 5,497,306; 5,669,699; 5,823,654; 6,176,602 and/or 6,276,821, which are hereby incorporated herein by reference in their entireties.

For example, and such as described in U.S. Pat. No. 6,227,689, incorporated above, the mirror assembly may include a mounting portion, which is secured along a side of a vehicle, and which may further include a sail or trim portion. The housing and mounting portion may be a one piece construction for fixedly mounting the housing relative to the vehicle. Alternately, the mirror assembly may be a foldable mirror, such that the housing is pivotally mounted to the mounting portion and is pivotable about a pivot spindle between an operative position and a folded position where the housing is folded alongside the vehicle. Preferably, the rearview mirror assembly further includes a mirror wiring harness, which is electronically connectable to the vehicle wiring within the vehicle, for providing power and/or control to one or more electronic accessories within the mirror assembly.

Optionally, the module may be supplied or provided to an assembly facility (such as a mirror assembly facility or the like) from a module supplier while the back plate may be supplied or provided to the assembly facility from a back plate supplier. An operator at the assembly facility may attach the module to the back plate, preferably by snapping the module to the back plate to assemble the display or indicator to the back plate. Optionally, and desirably, electrical connection (such as to a power supply or 12 volt power wire of the vehicle battery/ignition system or to a power feed from a LIN bus controller) to the module may be made when the module is snapped or otherwise attached (preferably mechanically but optionally adhesively) to the back plate (such as by making electrical contact between the module and mirror circuitry [including circuitry associated with the reflective element and/or mirror assembly, such as electrochromic mirror circuitry, mirror lights and display circuitry and the like, typically disposed at a printed circuit board of the mirror assembly] when the module is snapped to the back plate, such as by press attaching the display module into receiving fingers or clips or snaps or the like that are integrally formed with the back plate in the injection molding operation that manufactures or forms the back plate itself) or alternately, electrical connection to the module may be made via other means, such as wires or leads or the like before or after the module is snapped or attached to the back plate.

As best seen in FIG. 3B, indicator mounting portion 24 extends at an acute angle A (such as approximately seventy to eighty degrees or thereabouts) relative to the plane defined by back plate 20 so as to direct or guide light through the passageway and in the desired direction for viewing the object/LCA indication principally or solely by the driver of the host vehicle. Indicator mounting portion 24 thus directs the illumination from indicator 26 to and through the reflective element to illuminate the display area 28a so that the iconistic display is viewable by the driver of the vehicle.

Preferably, indicator mounting portion 24 includes light absorbing means to substantially absorb non-axially directed light rays passing through the passageway 24a (such as illustrated via the light rays 29 in FIG. 3B). For example, the inner wall or surface 24b of passageway 24a of indicator mounting portion 24 may be black or dark, and may be at least partially light absorbing, and preferably substantially light absorbing, and most preferably fully light absorbing of light incident thereon. Thus, principally only light rays that pass substantially or entirely through the full length of the inner passageway exit the end of the light emitting passageway, and, therefore, the light emitting source is mainly visible only by viewing axially along or substantially along the line of direction of the passageway. This helps ensure that, for example, only a driver of the host vehicle principally sees and views the light source when actuated, such as in a blind spot detection/alert system. As shown in FIGS. 3A and 3B, the inner surface 24b of passageway 24a of indicator mounting portion 24 may include light absorbing elements or structure 24c, such as graining or stippling or holes (where the light may escape or leak from the indicator mounting portion and into the mirror casing where it is not readily seen by a person viewing the mirror assembly) or dark, light absorbing cavities or fluting or the like formed at the inner surface 24b of passageway 24a to provide a rough surface or otherwise diffuse reflecting surface along the passageway 24a. The walls of the indicator mounting portion passageway thus function as a light trap and/or at least partially absorb the light emitted by the indicator and, thus, limit reflecting of light along the extension or indicator mounting portion.

Optionally, and as shown in FIG. 4, the indicator mounting portion 24' of back plate 20' may be bent or curved or kinked to further trap light or illumination emitted by the indicator. The illumination beam of indicator 26' is thus off-axis with respect to the desired angle of projection of the light (the angle A' of the portion 24a' of indicator mounting portion 24' that is directed toward the driver of the vehicle). The indicator thus may emit light at the bent portion 24b', and the off-axis angled portion 24a' of the indicator mounting portion 24' that is at or adjacent to the reflective element (not shown in FIG. 4) may be at the desired angle so that the principle beam axis of the emitted light is directed generally toward the driver of the vehicle.

Thus, the indicator mounting portion or extension that is integrally formed with the back plate functions as a guide or light directing device or element for directing illumination from the indicator through the mirror reflective element and in the desired direction or angle for viewing principally by the driver of the vehicle. The angle A (FIG. 3B) of indicator mounting portion 24 relative to back plate 20 may be selected to be directed toward a typical driver's head area when the reflective element is positioned to provide a typical or desired sideward and rearward field of view to a typical driver of the vehicle. The passageway may be generally cylindrical or may be generally conical or non-cylindrical, with a wider end at the reflective element. As shown in FIG. 3B, the width dimension B of the area at which iconistic portions 132a are established may be wider than the dimension C at the passageway opening at the reflective element. The length D of the indicator mounting portion and passageway may be selected to provide the desired light directing function, and may be selected to be a greater length to provide enhanced directing of light in the desired direction.

Although shown in FIGS. 2 and 3 as having a single indicator mounting portion for providing an object in a blind spot/LCA display/indication to the driver of the host vehicle, the mirror assembly may also or otherwise include an indicator mounting portion and indicator for providing a turn signal indicator or display that is principally viewable by the drivers of other vehicles adjacent to or rearward of the host vehicle. For example, and with reference to FIG. 5, a mirror reflector sub-assembly 112 may include a back plate 120 that has two extensions or indicator mounting portions 124a, 124b integrally formed therewith. Mirror reflector sub-assembly 112 includes a reflective element with a rear substrate 130 having a transflective coating 131 at its front surface 130a and a dark or opacifying element or layer or coating or tape or film 136 at its opposite rear surface. The dark layer 136 forms or defines two iconistic display portions 136a, 136b (in a similar manner as described above) to form or define two display areas 128a, 128b. A pair of indicators or indicator modules 126a, 126b are mounted to or attached to or received in the respective indicator mounting portions 124a, 124b as described above, and are operable or energizable to provide illumination at and along the respective indicator mounting portion so as to illuminate the respective iconistic portions 136a, 136b and display areas 128a, 128b.

For example, indicator mounting portion 124a may be angled as described above to direct the principle beam axis of emitted/transmitted illumination toward the driver of the vehicle so that the iconistic portions 136a and display area 128a may display an ISO type display or the like, while indicator mounting portion 124b may be angled so that the turn signal light beam emitted by the indicator 126b and transmitted through the reflective element has its principle beam axis directed generally away from the eyes of the driver seated in the interior cabin of the host vehicle and generally away from the side of the vehicle so as to be viewable by the driver or occupant of a vehicle that is overtaking the host vehicle. The indicator mounting portion 124b thus directs illumination away from the driver of the vehicle so that the iconistic portions 136b and display area 128b may display a turn signal icon or the like for viewing by drivers of other vehicles.

Figure 5:
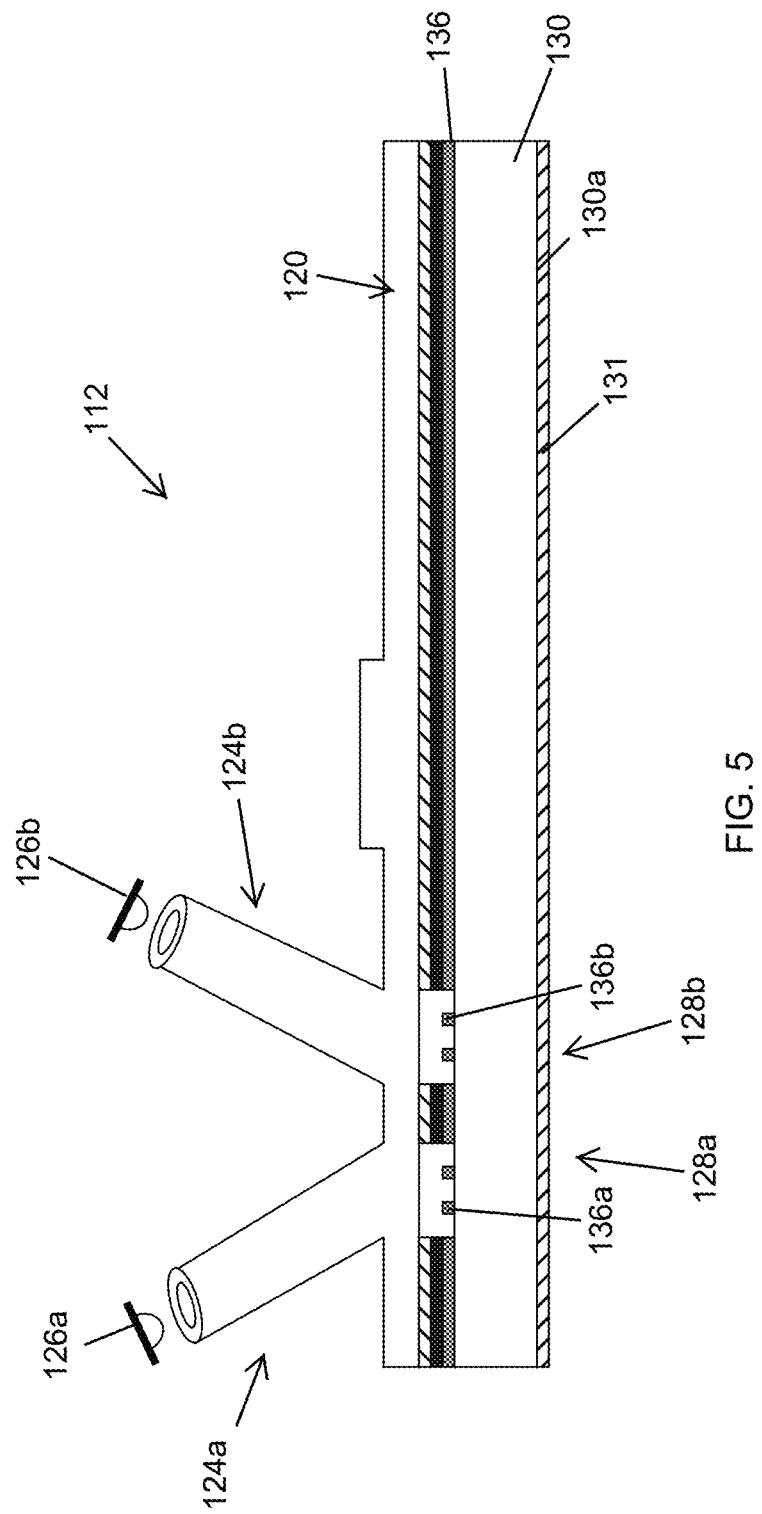
FIG. 5 is a partial sectional view of a portion of another mirror reflector sub-assembly of the present invention.

The back plate 120 and indicator mounting portions 124a, 124b and indicators 126a, 126b and mirror reflector sub-assembly 112 may be otherwise substantially similar to the back plates and indicator mounting portions and indicators and mirror reflector sub-assemblies described above, such that a detailed discussion of the mirror reflector sub-assemblies will not be repeated herein. The indicator mounting portions or extensions may be arranged side-by-side one another (such as shown in FIG. 5) or may be vertically staggered or offset or otherwise oriented or arranged at the back plate to position the indicator at the desired location and to direct the illumination at the desired angle through the respective iconistic portions and display areas established or defined at the reflective element.

Figure 6:
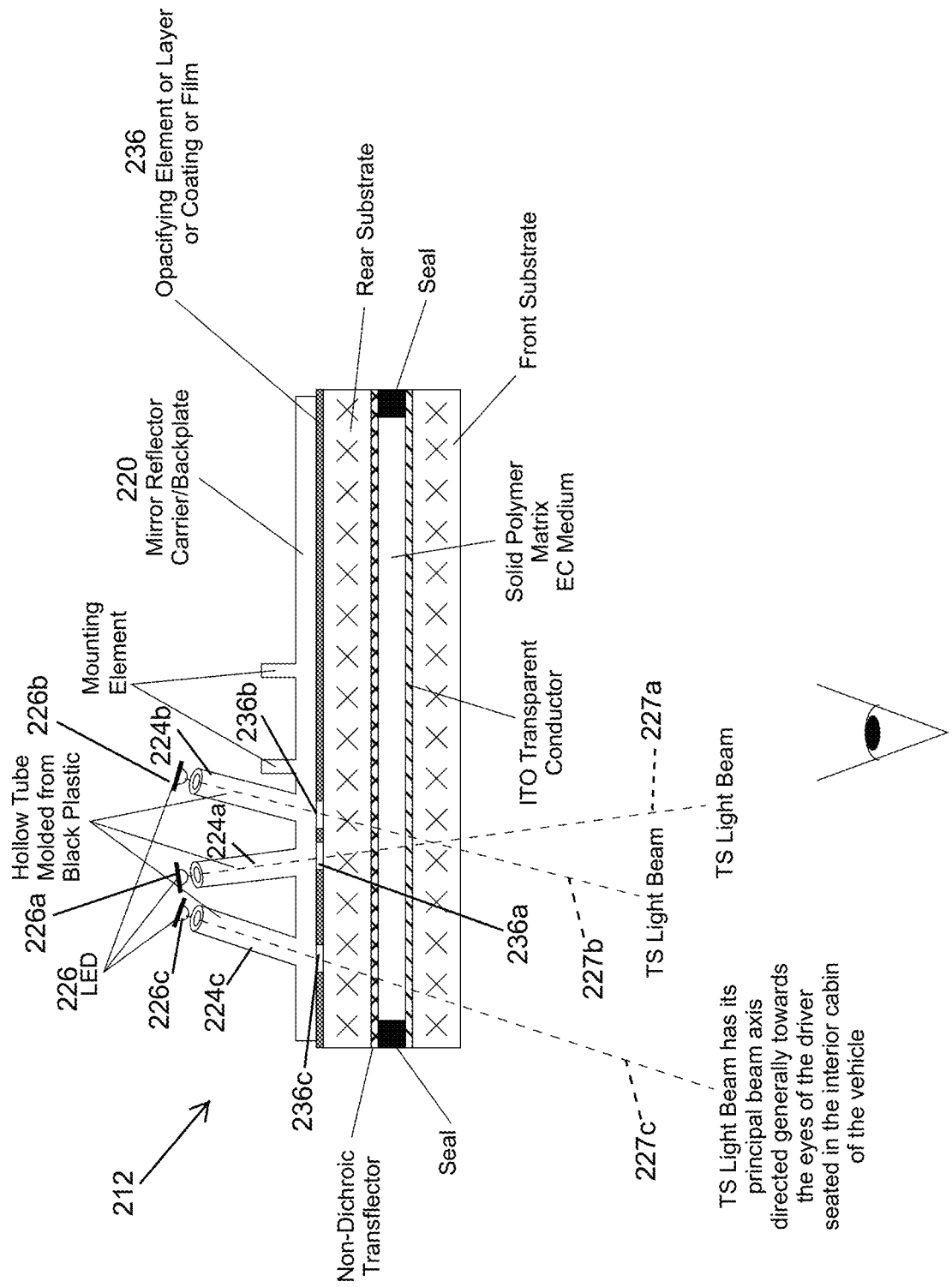
FIG. 6 is a partial sectional view of another mirror reflector sub-assembly of the present invention.

Optionally, and with reference to FIG. 6, a mirror reflector sub-assembly 212 includes a back plate 220 that is molded or formed with three hollow indicator mounting portions 224a, 224b, 224c and associated or respective illumination sources or LEDs 226. The indicator mounting portions 224a, 224b, 224c may be generally aligned with respective indicia portions 236a, 236b, 236c established in an opacifying element or layer or coating or film 236 sandwiched between the mirror reflector carrier or back plate 220 and the rear surface of the rear substrate 230 of the reflective element 218 (although not shown in FIG. 6, the mirror reflector sub-assembly may also include a heater pad as described above, without affecting the scope of the present invention). In the illustrated embodiment, one of the indicators 226a and indicator mounting portions 224a function as an object/LCA indicator and direct the principle beam axis 227a toward the driver of the host vehicle, while two of the indicators 226b, 226c and indicator mounting portions 224b, 224c function as turn signal indicators (or other indicators for indicating information to drivers of other vehicles, such as brake light indicators or hazard indicators or the like) and direct the principle beam axes 227b, 227c away from the host vehicle for viewing by the drivers of other vehicles alongside or overtaking the host vehicle. Optionally, the indicator mounting portion or tube 224a, or another similarly angled indicator mounting portion or tube, may be angled so as to direct the principle beam axis or axes toward the host vehicle for conveying other vehicle information to the driver of the host vehicle.

Figure 7:
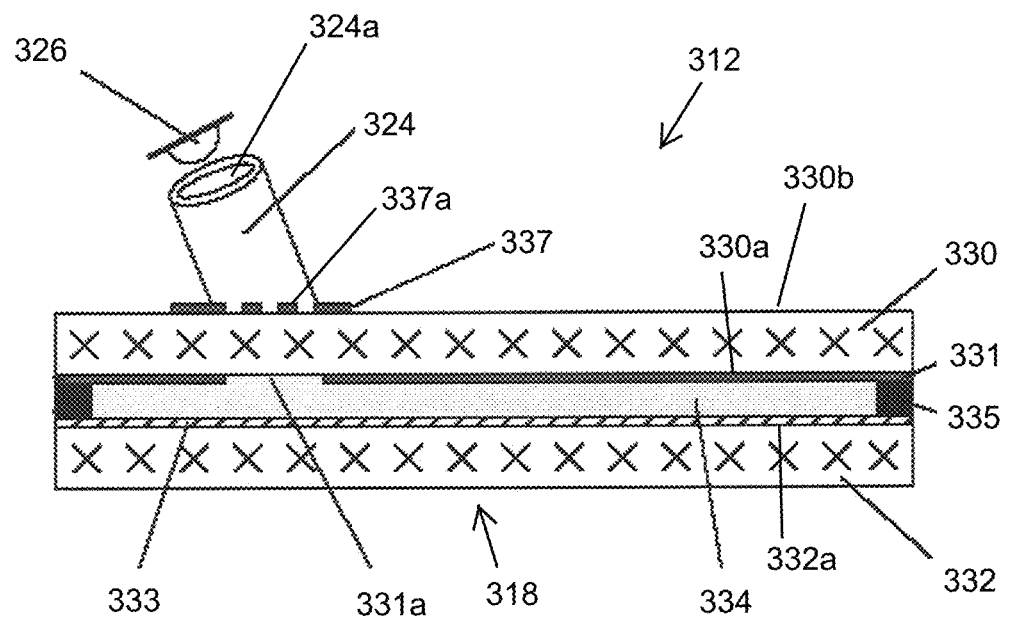
FIG. 7 is a sectional view of another mirror reflector sub-assembly of the present invention.

Optionally, and with reference to FIG. 7, a mirror reflector sub-assembly 312 includes a hollow indicator mounting portion or tube or extension 324 that may be attached to (such as by adhering or the like) the rear surface 330b of a rear substrate 330 of a reflective element 318. The indicator mounting portion 324 may be positioned at and attached to a mask 337 disposed at the rear surface 330b of rear substrate 330 and between the indicator mounting portion 324 and the rear surface 330b. The indicator mounting portion 324 comprises a hollow tube molded from a dark (such as black or dark blue or the like) plastic material, and receives or attaches to an indicator 326 at its end opposite the reflective element 318, so that illumination or light from the indicator 326 passes through a passageway 324a of indicator mounting portion 324, such as in a similar manner as described above. The mask 337 has indicia or icons 337a established therethrough so that illumination passing through the passageway of the indicator mounting portion passes through the holes or apertures formed in the mask so that the desired indicia or icon or symbol is viewable by a person viewing the reflective element.

The rear substrate 330 of reflective element 318 includes a metallic reflector or reflective coating or layer 331 disposed on its forward or third surface 330a, and further includes an electrochromic medium 334 (and perimeter seal 335) sandwiched between the metallic reflector 331 at the rear substrate 330 and a transparent conductive coating or layer 333 at a rear surface 332a of a front substrate 332. In the illustrated embodiment, the metallic reflective coating 331 is substantially reflective and may not comprise a transflective coating or layer. Thus, an aperture or hole 331a is formed or established through the metallic reflective coating or layer 331 and generally at or near the location at which the indicator mounting portion 324 and mask 337 are positioned or mounted. In such an embodiment, the reflective element 318 may not include an opacifying layer, whereby a separate mask may be disposed at the rear surface of the rear substrate to establish the icons or indicia for the indicator device.

Figure 8:
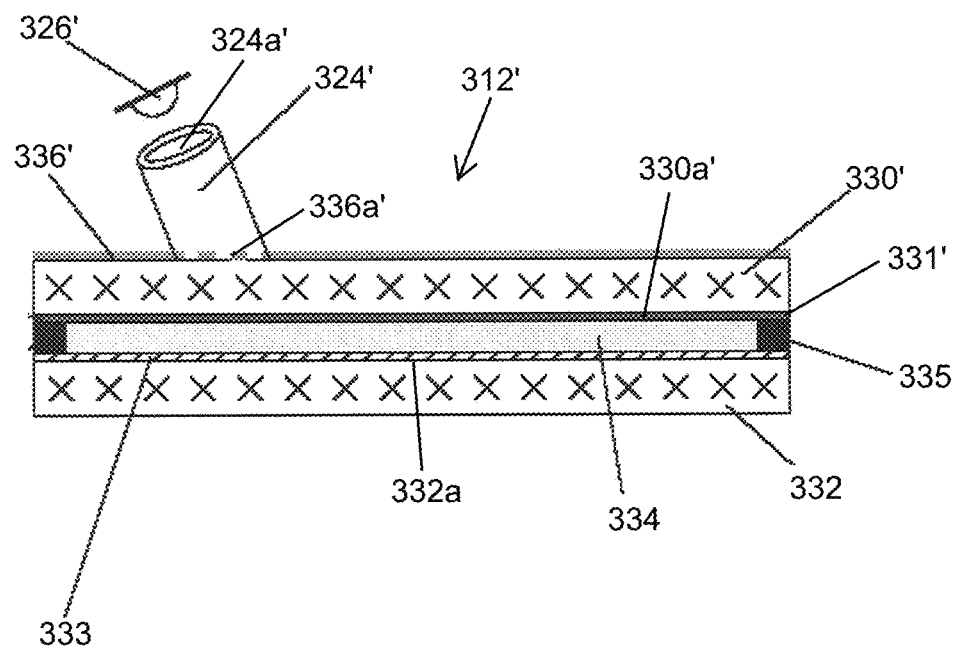
FIG. 8 is a sectional view of another mirror reflector sub-assembly of the present invention.

Optionally, and as shown in FIG. 8, a mirror reflector sub-assembly 312' includes an indicator mounting portion or hollow tube 324' and indicator 326' located at or attached or adhered to an opacifying layer 336' disposed at the rear surface 330a' of a rear substrate 330' of a reflective element 318', where the blind spot alert icon or indicia 336a' is established through the opacifying layer 336', such as in a similar manner as described above. In the illustrated embodiment, the rear substrate 330' includes a non-dichroic transflector or transflective coating or layer 331' disposed on its forward or third surface 330a', and further includes an electrochromic medium 334 (and perimeter seal 335) sandwiched between the transflector 331' and a transparent conductive coating or layer 333 at a rear surface 332a of a front substrate 332. In the illustrated embodiment, the transflective coating 331' is at least partially transmitting, and thus does not require an aperture or hole formed or established therethrough. The indicator mounting portion 324' comprises a hollow tube molded from a dark (such as black or dark blue or the like) plastic material, and receives or attaches to indicator 326' at its end opposite the reflective element 318', so that illumination or light from the indicator 326' passes through a passageway 324a' of indicator mounting portion, such as in a similar manner as described above. The opacifying layer 336' has indicia or icons 336a' established therethrough so that illumination passing through the passageway of the indicator mounting portion passes through the holes or apertures formed in the mask and passes through the reflective element so that the desired indicia or icon or symbol is viewable by a person viewing the reflective element.

The indicator mounting portions 324, 324' may be formed at the desired angle and may be adhered to or otherwise attached to the mask or the opacifying layer or the rear surface of the rear substrate or the like, whereby illumination from the associated indicator is guided in the desired or appropriate direction (such as generally toward the driver of the host vehicle for a blind spot alert indicator or generally away from the driver of the host vehicle for a turn signal indicator or the like) in a similar manner as described above. The plastic tube or tubes or indicator mounting portion/portions may be similar to the indicator mounting portions of the back plates discussed above, and may include light absorbing or substantially light absorbing means on or in or through or partially through the inner surface of the passageway defined along the tube, such that principally only light rays that pass substantially through the full length of the inner passageway exit the end of the light emitting passageway, whereby the light emitted by the light emitting source is mainly visible only by viewing axially along or substantially along the line of direction of the passageway. Optionally, the indicator mounting portions and indicators may be provided as an indicator module that is readily attached to the rear of the reflective element and electrically connected to the appropriate circuitry or wires of the mirror assembly.

The reflective elements 318, 318' may be otherwise substantially similar to the reflective elements described above, such that a detailed discussion of the reflective elements will not be repeated herein. The angle and direction of the indicator mounting portions may be selected depending on the particular associated display indicia or icons and on the particular mirror application. The reflector carrier or back plate (not shown in FIGS. 7 and 8) of the mirror reflector sub-assemblies may have an aperture or opening therethrough for at least partially receiving the indicator mounting portion or portions or hollow tube or tubes therethrough when the back plate is attached to the rear surface of the reflective element, whereby the hollow tube or tubes (and associated indicator or indicators) may protrude at least partially through the back plate when the mirror reflector sub-assembly is assembled. Optionally, the icons or displays of the mirror reflector sub-assemblies described herein may be established utilizing aspects of the icons or symbols or indicia described in U.S. patent application Ser. No. 11/226,628, filed Sep. 14, 2005 and published Mar. 23, 2006 as U.S. Publication No. US-2006-0061008; and/or PCT Application No. PCT/US2006/018567, filed May 15, 2006 and published Nov. 23, 2006 as International Publication No. WO 2006/124682, which are hereby incorporated herein by reference in their entireties.

Optionally, the mirror reflector sub-assembly may include masks or baffles or light direction means or occluding means or directional filtering, such as louvers or shutters or filters or light directing film or the like, at the rear of the reflective element (such as between the back plate and the iconistic portions) for further directing or guiding the illumination from the illumination source at the desired angle and through the reflective element so as to be principally or solely viewable by the driver of the host vehicle (for blind spot/LCA applications) or so as to be principally or solely viewable by others at the side or rear of the vehicle (for turn signal applications).

Therefore, the present invention provides a back plate that includes one or more indicator mounting portions or display receiving portions integrally formed therewith, so that the display element or device may be readily assembled to the mirror reflector sub-assembly via attachment or adherence of the back plate to the mirror reflective element. The present invention thus provides a display element or device that is readily assembled to a mirror reflector sub-assembly, and thus facilitates assembly of the mirror reflector sub-assembly at a facility remote from the mirror assembly facility, such that the mirror reflector sub-assembly (including the back plate and indicator mounting portion) may be provided or supplied to the mirror manufacturer as a unit. The mirror manufacturer then may install or attach the indicator or indicator module to the indicator mounting or receiving portion (or may electrically connect an already installed indicator to a wire or lead of the mirror assembly), and may attach the mirror reflector sub-assembly to the mirror actuator. The present invention thus provides enhanced assembly processing of the mirror assembly, while taking advantage of the otherwise typically unused space within the casing and behind the back plate of the exterior rearview mirror assembly.

Although shown and described as being located at a driver side exterior mirror, the blind spot/LCA/turn signal indicator of the present invention may also or otherwise be located at the passenger side exterior mirror, if desired. Optionally, a blind spot indicator in accordance with the present invention may be located at both the driver side mirror assembly and the passenger side mirror assembly of the host vehicle. The indicator at either side may be selectively activated or illuminated to indicate to the driver of the host vehicle that an object or other vehicle has been detected at that particular side lane region of the host vehicle. Optionally, the blind spot indicator may be associated with a blind spot detection and indication system that includes one or more indicators at the interior rearview mirror assembly of the host vehicle. The blind spot indicators may utilize aspects of the blind spot indicators and/or blind spot detection systems described in U.S. Pat. Nos. 6,198,409; 5,929,786 and 5,786,772, and/or PCT Application No. PCT/US2006/026148, filed Jul. 5, 2006 and published Jan. 11, 2007 as International Publication No. WO 2007/005942, which are hereby incorporated herein by reference in their entireties.

For example, and such as described in International Publication No. WO 2007/005942, incorporated above, the blind spot indicator may be operable in association with a blind spot detection system, which may include an imaging sensor or sensors, or ultrasonic sensor or sensors, or sonar sensor or sensors or the like.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198, 409; 5,929,786 and 5,786,772, and/or U.S. patent application Ser. No. 11/315,675, filed Dec. 22, 2005, now U.S. Pat. No. 7,720,580; and/or PCT Application No. PCT/US2006/ 026148, filed Jul. 5, 2006 and published Jan. 11, 2007 as International Publication No. WO 2007/005942, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

Optionally, and with reference to FIGS. 9 and 10, a mirror reflector sub-assembly 412 includes a mirror reflective element 418 and a mirror reflector carrier or back plate 420 attached to or mounted to or adhered to a rear surface 418*a* of mirror reflective element 418. The mirror reflector sub-assembly 412 includes a display device or display element 422 that is operable to provide a display or indication at the reflective element for viewing the display or indication through the mirror reflective element when the display device is electrically actuated. Display element 422 includes a light source 434, which is disposed at a display portion or a display mounting or attaching portion or display receiving portion or structure 430 (such as a corner portion or region, such as an upper outside/far quadrant or corner portion or region that is outboard of and separate from the reflective element so that light emitted by the light source or sources of the display element does not impinge on or pass through any portion of the reflective element 418, and is desirably at the outer or far side of the reflective element and away from the vehicle at which the mirror assembly is mounted) of the back plate 420 and is located at a perimeter region of the reflective element sub-assembly so as to be operable to emit light outside of the perimeter of the reflective element 418 and not through the reflective element 418, such as discussed below. Since the back plate itself is mounted on the mirror actuator, the back plate, reflective element and display element move in tandem when the mirror actuator is actuated to adjust the rearward field of view as reflected by the mirror reflective element.

Back plate 420 is molded or formed, such as by injection molding, so as to provide the display receiving portion 430 and a generally planar backing portion 420*a* that attaches to the rear surface 418*a* of the reflective element 418 (such as via adhesive or other suitable attachment means). Preferably, back plate 420, including display receiving portion 430, is molded of a substantially dark or opaque or black material, such as from an ABS or polycarbonate polymeric resin material or from any other suitable material such as known in the exterior rearview mirror art, so as to be substantially opaque such that light does not pass through the opaque back plate and display receiving portion. An attachment element or elements 420*b* may be formed or established at the rear of the backing portion 420*a* for attaching the back plate 420 and reflective element to a mirror actuator, such as a mirror actuator as known in the art and/or as described in U.S. Pat. Nos. 7,080,914; 7,073,914; 6,916,100; 6,755,544; 6,685, 864; 6,467,920; 6,362,548; 6,243,218; 6,229,226; 6,213, 612; 5,986,364 and 5,900,999, which are hereby incorporated herein by reference herein in their entireties.

Optionally, a heater pad 437 may be provided at the rear surface 418*a* of the reflective element 418 and between the backing portion 420*a* of back plate 420 and the reflective element 418 to provide an anti-fogging of de-fogging feature to the exterior mirror assembly (such as by utilizing aspects of the heater elements or pads described in U.S. patent application Ser. No. 11/334,139, filed Jan. 18, 2006, now U.S. Pat. No. 7,400,435, which is hereby incorporated herein by reference in its entirety). The back plate and/or heater pad may include suitable electrical connectors and connections incorporated therein (such as by utilizing aspects of the mirror assembly described in U.S. patent application Ser. No. 11/334,139, filed Jan. 18, 2006, now U.S. Pat. No. 7,400,435, which is hereby incorporated herein by reference in its entirety) for electrically connecting the heater pad and/or display element (or other suitable electrical connectors may be utilized, such as electrical leads or wire harnesses or pigtails or other separate connectors or cables or the like).

Back plate 420 may include a perimeter framing portion or bezel portion 420c that extends around the perimeter edges of the reflective element 418 to support the reflective element and frame the reflective element at the mirror assembly. The perimeter bezel portion may be narrow or small depending on the particular application of the reflective element and mirror reflector sub-assembly. Optionally, the mirror reflector sub-assembly may comprise a bezelless or frameless reflective element (such as the types described in U.S. patent application Ser. No. 11/226,628, filed Sep. 14, 2005 and published Mar. 23, 2006 as U.S. Publication No. US-2006-0061008; Ser. No. 10/533,762, filed May 4, 2005, now U.S. Pat. No. 7,184,190; and/or Ser. No. 11/021,065, filed Dec. 23, 2004, now U.S. Pat. No. 7,255,451, and/or PCT Application No. PCT/US2006/018567, filed May 15, 2006 and published Nov. 23, 2006 as International Publication No. WO 2006/124682, which are hereby incorporated herein by reference in their entireties), whereby the back plate may not include a perimeter framing portion or bezel portion around the perimeter of the reflective element.

Optionally, and as shown in phantom in FIG. 10, the bezel portion 420c may include a lip or tab or shelf 420d at a portion thereof. The lip 420d protrudes forward of the bezel portion and over a portion of a forward surface of the reflective element when the reflective element is attached to the back plate. Thus, the reflective element and heater pad may be inserted or loaded into the back plate by inserting a perimeter region of the reflective element into the back plate and under or behind the tab 420d and pivoting the reflective element into position whereby the reflective element is at least partially recessed within the frame or bezel portion of the back plate.

In the illustrated embodiment, display receiving portion 430 of back plate 420 is formed or established or disposed at the outer and upper corner of the reflective element sub-assembly 412 so as to be readily viewable by drivers of other vehicles at the side of or rearward of the host vehicle, while not unduly interfering with the primary rearward field of view of the driver of the host vehicle via the mirror reflector of the mirror reflective element. As shown in FIGS. 9 and 10, display receiving portion 430 may be received at a corner region or cut-out region of the reflective element 418 so as to be viewable outside of the reflective element and not through the reflective element. The size and shape of the display receiving portion and display area may be selected depending on the particular application of the mirror reflector sub-assembly, and may be nested in a corner region of the mirror reflective element (or could be located along a side region, such as the outer or inner side region of the reflective element, or an upper or lower region of the reflective element), and may be formed to have a reduced or minimum size or footprint at the perimeter or corner of the reflective element.

Thus, because the display element is separate from the reflective element and does not project or emit light through the reflective element (so that light emitted by the light source and emanating from the display element does not pass through the reflective element before exiting the mirror sub-assembly), the mirror reflector manufacturer does not have to specially modify the mirror reflector of the reflective element, such as by creating apertures or windows in the reflective coating or reflector or by making the reflector a transflective or transreflective mirror reflector. Thus, the mirror reflector may comprise a mirror reflector that does not require any etching or removal of the reflector coating and does not require any special coatings that may provide a transmissive function as well as a reflective function. Such a mirror assembly and display is thus in stark contrast to known mirror assemblies with through-the-glass displays such as the types described in U.S. Pat. Nos. 5,788,357 and 6,700,692, which are hereby incorporated herein by reference in their entireties.

As shown in FIG. 10, a rear surface 430a of display receiving portion 430 may be angled or canted or slanted and may receive or support display element 422 thereat. For example, rear surface 430a may receive and support a circuit board or circuit element 432 (such as a printed circuit board or the like) thereat or thereon, while a front surface 430b of display receiving portion 430 may be generally flush with the front or outer surface 418b of the reflective element 418 (the surface that faces rearward when the mirror assembly is mounted at the vehicle). Circuit element 432 is thus located at the rear surface 430a of display receiving portion 430 and includes or supports one or more illumination sources or light sources or indicators 434 (preferably light emitting diodes (LEDs) or the like, which emit or project light through display receiving portion 430, such as via one or more passageways 430c formed or established through display receiving portion 430. The LEDs 434 may be received at a recess or rearward end of the passageways 430c so that light emitted by the LEDs 434 is directed along the passageways 430c and through the display receiving portion 430 and not through the reflective element 418.

In the illustrated embodiment, the passageways 430c are angled through display receiving portion 430 and are generally normal to circuit element 432. As can be seen in FIG. 10, the passageways 430c are angled outward and away from the reflective element and thus away from the host vehicle and away from the driver of the host vehicle. The illumination sources or LEDs 434 are located at circuit element 432 and at or near the end of passageways 430c so that light 434a emitted by LEDs 434 is emitted through passageways 430c and away from the view of the driver of the host vehicle sitting in the vehicle cabin. The angle of the rear surface and/or the passageways may be selected to provide the desired angle of the light path as the light exits the display receiving portion, depending on the particular application of the display device and reflective element sub-assembly. The passageways or slots may be established to provide the desired indicator form or shape, such as a chevron shape or arrowhead shape or other suitable shape or form (such as five or seven individual segments or indicating elements (or more or less) that are configured and/or arranged to form the selected icon or chevron shape or arrow shape or the like), and may be readily viewable and discernible and recognizable when the indicators or LEDs are activated. Because the back plate 420 and display receiving portion 430 of back plate 420 are substantially opaque, the passageways and indicators are not readily viewable and discernible when the indicators or LEDs are deactivated.

Although shown and described as having hollow passageways, it is envisioned that the display receiving portion may include tubes or pipes through the display portion, whereby light emitted by the light sources passes through the tubes or pipes disposed at or in or through the display receiving portion. Also, although shown and described as having hollow passageways, it is envisioned that the display receiving portion may be filled with a transparent light conducting material or optical plastic, such as polycarbonate or acrylic or acrylate or polystyrene or COC olefin or the like, or other suitable optical medium, such as via co-injection molding of such materials, whereby light emitted by the light sources passes through the optical medium of the display receiving portion. The light conducting passageways or light pipes or light tubes or light conducting material may be configured to provide the desired or appropriate icon or display, and may provide a solid arrow display (or other suitable solid shape) or may provide a series of individual holes or apertures or pipes or tubes or the like that combine to form an arrow (or other suitable shape), while remaining within the spirit and scope of the present invention. It is further envisioned that if the passageways are filled or partially filled with a light conducting material or other optical medium, the passageways would not be open at the exterior end of the passageways and thus, the light conducting material would limit or substantially preclude dirt or debris or water or other environmental elements from entering or blocking the passageways, whereby a cover plate (discussed below) may not be needed at the outer surface of the display element.

Thus, the back plate of the mirror sub-assembly may be molded or formed to include the display portion at its upper far corner or quadrant (or elsewhere as desired) so that the display receiving portion is outside of the glass or reflective element and thus does not provide a "through-the-glass" turn signal indicator (such as the through-the-glass types of indicators described in U.S. Pat. Nos. 5,788,357 and 6,700,692, which are hereby incorporated herein by reference in their entireties). The molded display receiving portion is angled with correspondingly angled holes or passageways or slots that form or establish the desired shape of the indicator. Optionally, the display element or device may include a light directing film and/or a polarizing film to direct/modify the light emitted by the LEDs along the passageways or slots through the display receiving portion of the back plate, such as by utilizing aspects of the display devices described in U.S. provisional applications, Ser. No. 60/732,245, filed Nov. 1, 2005; Ser. No. 60/759,992, filed Jan. 18, 2006; and Ser. No. 60/836,219, filed Aug. 8, 2006; and/or U.S. patent application Ser. No. 10/993,302, filed Nov. 19, 2004, now U.S. Pat. No. 7,338,177; and/or Ser. No. 11/226,628, filed Sep. 14, 2005 and published Mar. 23, 2006 as U.S. Publication No. US-2006-0061008, and/or PCT Application No. PCT/US2006/018567, filed May 15, 2006 and published Nov. 23, 2006 as International Publication No. WO 2006/124682; and/or U.S. Pat. No. 7,083,312, which are hereby incorporated herein by reference in their entireties.

Optionally, the display element (preferably comprising a stand-alone unitary module that is substantially sealed so as to be substantially impervious to water ingress or to debris ingress, and most preferably with electrical connectors (such as a plug or socket connector) established or incorporated therein or with a lead or wire harness (such as a flying lead or pigtail) established or incorporated therein), including the light source and circuitry, may be supplied or provided to an assembly facility (such as a mirror assembly facility or the like) from a display element supplier, while the back plate may be molded and supplied or provided to the assembly facility from a back plate supplier. An operator at the assembly facility may attach the display device and/or circuitry to the back plate (such as to the rear surface of the display receiving portion of the back plate, preferably by snapping the display device or module to snaps or clips or clasps or fingers or the like molded into the back plate (at its display element receiving portion) to assemble the display or indicator to the back plate. Optionally, and desirably, the display receiving portion of the back plate and/or the display element (such as at the circuit element or circuit board) may have attaching elements or snaps or clips or prongs to ease the assembly and securement of the display element to the display receiving portion of the back plate so that an operator may attach the display element to the back plate via a snap connection or attachment.

Optionally, and desirably, electrical connection (such as to a power supply or 12 volt power wire of the vehicle battery/ignition system or to a power feed from a LIN bus controller) to the display circuitry may be made when the display element is snapped or otherwise attached (preferably mechanically but optionally adhesively) to the back plate, such as by making electrical contact between the display element and mirror circuitry (including circuitry associated with the reflective element and/or mirror assembly, such as electrochromic mirror circuitry, mirror lights and/or display circuitry and the like, typically disposed at a printed circuit board of the mirror assembly) when the display element is snapped to the back plate, such as via pressed contact or connection between respective electrical terminals or contacts of the display element and mirror circuitry as the display element is pressed or snapped or received to the display receiving portion of the back plate, such as by press attaching the display element or module into receiving fingers or clips or snaps or the like that are integrally formed with the display receiving portion of the back plate in the injection molding operation that manufactures or forms the back plate itself. For example, electrical terminals or contacts may be insert molded in the display receiving portion so as to be exposed at (or otherwise located at) the rear surface of the display receiving portion for electrical connection to the display element when the display element is attached or snapped to the display receiving portion of the back plate. Alternately, electrical connection to the display device may be made via other means, such as wires or leads or flying leads or wire harnesses or the like such as pigtails or other suitable connectors or leads, and before or after the display device is snapped or otherwise attached to the back plate, while remaining within the spirit and scope of the present invention.

Thus, a method of assembling such a mirror reflective element sub-assembly may include molding the back plate having a display receiving portion and providing the back plate and reflective element to an assembly facility, while also providing a display element or module at the assembly facility. Preferably, the display element and the back plate are supplied or provided to the assembly facility from different sources. An operator at the assembly facility takes a back plate and a display element and snaps the display element to the rear surface of the display receiving portion of the back plate to attach and secure the display element at the display receiving portion. The operator also makes the electrical connection between circuitry or wiring of the mirror assembly or sub-assembly and the display element, either as the display element is snapped to the display receiving portion of the back plate (such as via contacts at the display element and display receiving portion of the back plate) or at a separate time from the attachment of the display element to the back plate (such as via separate connectors at or extending from the display element). Optionally, electrical connection to the display element may be made during assembly of the reflective element sub-assembly to the mirror casing of the mirror assembly (such as via connectors or leads or pigtails extending from the display element).

Optionally, and with reference to FIGS. 11 and 12, a display element or device 422' of a mirror reflective element sub-assembly 412' is operable to provide a display or indication at the reflective element for viewing the display or indication through the mirror reflective element. Display device 422' is disposed at a display receiving portion 430' (such as a corner portion or region, such as an upper outside/far quadrant or corner portion or region that is at the outer side of the reflective element and away from the vehicle at which the mirror assembly is mounted) of the back plate 420' and is located at a perimeter region of the reflective element sub-assembly so as to be operable to emit light outside of the perimeter of the reflective element 418' and not through the reflective element 418', such as in a similar manner as described above.

As shown in FIG. 12, display device 422' includes a light control film 436' established or disposed between the rear surface 430a' of display receiving portion 430' and the LEDs 434' and circuit element 432'. For example, the light control film 436' may be disposed or adhered otherwise attached at the rear surface 430a' so that light 434a' that is emitted by LEDs 434' is directed through the light control film 436' and through the passageways 430c' established through display receiving portion 430'. Light control film 436' may comprise any suitable film and may function as microlouvers, so as to preferentially direct light that is received from one angle whereby the light is redirected or controlled to another direction (such as the films of the types described in PCT Application No. PCT/US2006/018567, filed May 15, 2006 and published on Nov. 23, 2006 as International Publication No. WO 2006/124682, which is hereby incorporated herein by reference in its entirety). An example of a suitable light control film or material is disclosed in U.S. Pat. No. 5,481,409 (which is hereby incorporated herein by reference in its entirety), and may comprise a light control film manufactured by the 3M Company of Minn., such as the light control film commercially available under the trade name LCF-P (light control film—polycarbonate).

Such a film comprises a thin plastic film enclosing a plurality of closely spaced, light black colored microlouvers. A preferred light control film is approximately 0.75 mm thick or thereabouts, and the angled microlouvers are spaced approximately 0.127 mm apart. The microlouvers may be in various angular positions to provide a particular viewing angle, such as from as narrow as about a 48 degree angle to as wide as about a 90 degree angle, depending on the desired angle of the microlouvers for the particular application for angling/directing the light in a desired or appropriate direction or angle. Thus, the light control film controls or directs the light 434a' emitted by the illumination sources or LEDs 434' along a desired or appropriate or predetermined angle with respect to front surface 430b' of display receiving portion 430' and the mirror substrate or reflective element 418', and helps assure that the driver of the host vehicle is largely unaware or not bothered by actuation of the turn signal indicating light sources.

The likes of a 3M Light Control Film comprises a thin plastic film containing closely spaced dark or black or light absorbing microlouvers. When used as described herein, the film simulates a tiny Venetian blind, wherein the microlouvers allow for controlled transmission of the light emitted by the indicator light sources (that are disposed behind the transflective mirror element) along the axis of the microlouvers so that the light is seen by drivers overtaking the host vehicle in a side-lane blind spot area but the line of sight from the driver of the host vehicle to the turn signal indicator's emitted light beam is substantially blocked by the microlouvers. Examples of light directing or regulating filters or baffle assemblies can be found in U.S. Pat. Nos. 4,906,085 and 5,313,335, the entire disclosures of which are hereby incorporated by reference herein.

Optionally, and typically, the light control film may have its microlouvers at an angle of about zero degrees (i.e., generally perpendicular to the plane of the light control film) so as to direct the principle beam axis of the light emitted by the illumination sources at the desired or appropriate angle established by the angling of the rear surface of the display receiving portion relative to its front surface and so as to have the light beam emitted by the light sources pass through the display receiving portion to exit at the desired or set or selected angle. Placement of the light control film on the angled rear surface of the display receiving portion is advantageous when the light control film (such as 3M's VIKUITI™ ALCF-P or LCF-P) is used where the louver angle is zero degrees and where on-axis vertically incident light from the light sources is highly transmitted but where off-axis light is cut-off by the embedded microlouvers. Such zero degree louvered light control film is used for privacy filters for laptop computer screens and ATM screens, and so is economically available. By being able to purchase and use zero angle louvered light control film, and by using the likes of an angled rear surface (pre-established via molding of the mirror back plate at its display receiving portion) to support the light control film at an angle in front of the light sources that are similarly angled and supported, economical assembly can be enhanced. Optionally, and alternatively, a mechanical support to mutually support and angle the light control film/light sources relative to the plane of the rear of the mirror reflective element may be used so that light emitted by the light sources is generally aligned with or on-axis with the light transmission axis between the louvers, and so that the light beam passed through the light control film has its principal beam axis directed in the desired or appropriate direction, such as in a direction generally away (for a turn signal indicator) from the vehicle body side and away from direct view by a driver of the host vehicle to which the exterior mirror reflective element is attached, or such as in a direction generally toward (for a blind spot indicator) the vehicle body side for direct viewing by the driver of the host vehicle and away from direct view by a driver of another vehicle.

As shown in FIG. 12, display device 422' further includes a light transmitting lens cover or cover element 438' that covers and substantially seals the passageways 430c' at the front surface 430b' of display receiving portion 430' to limit or substantially preclude dirt, debris, water and other elements and/or contaminants from being received at the outer ends of the passageways so as to keep the passageways clear and to protect and seal the electronic circuitry at the rear of the display portion. Cover element 438' may comprise a substantially transparent or clear cover element or may be tinted (such as red-tinted or amber-tinted) to provide a desired or appropriate color or tint to the light passing therethrough. Optionally, one or more diffusers or diffusing elements may be incorporated in the cover element or incorporated into the indicator or light module so as to provide a covered and/or tinted and/or diffused display at the mirror sub-assembly.

As can be seen with reference to FIGS. 11 and 12, cover element 438' may comprise a desired shape or form, such as a triangular form or shape or arrow shape or the like, while the LEDs 434' and passageways 430c' may function to illuminate the cover element 438'. Optionally, the cover element 438' may comprise an optical lens element with light directing properties configured to direct the light passing therethrough away from or further away from the body-side of the host vehicle so as to be generally not viewable by the driver of the host vehicle. Optionally, cover element 438' may be countersunk or received in a recess 430d' formed or established at the front surface 430b' of display portion 430' (for example the cover element may be molded or snapped into the recess). The display device thus is substantially water sealed and substantially water impervious and substantially impervious to dirt and debris and other environmental elements that the reflective element sub-assembly may typically encounter. Thus, the display device and back plate may be provided as a self-contained sealed module (or may be readily assembled to form a self-contained sealed module), and may have electrical connectors for electrically connecting the module to electrical connectors of the mirror assembly and/or of a vehicle wire harness or the like.

Thus, the back plate may be readily molded or formed with holes or apertures or passageways through its display receiving portion, and a cover element may be attached at the outer surface of the display receiving portion to substantially seal the passageways to limit or substantially preclude water intrusion and/or dirt or debris intrusion into the passageways. The snapping of the cover element at the display receiving portion thus forms a substantially tight fit over the passageways to substantially seal the passageways. Optionally, the cover element may partially plug or fill the passageways in a sealing manner (and/or a separate sealing material or element may be disposed between the cover and the display receiving portion to partially plug or fill the passageways), while providing for light transmission through the passageways and through the cover element. Preferably, the cover element may snap or otherwise mechanically attach to the display receiving portion to substantially seal the passageways as the mirror sub-assembly is formed and/or assembled.

The angle of the rear surface 430a' of display portion and/or of the passageways 430c', and of the microlouvers or other optical guiding elements, may be selected to provide the desired angle of the light path as the light exits the display portion and passes through the cover element 438', depending on the particular application of the display device and mirror reflective element sub-assembly. Mirror reflective element sub-assembly 412' may otherwise be substantially similar as mirror reflective element sub-assembly 412 described above, such that a detailed discussion of the mirror reflective element sub-assemblies need not be repeated herein. The common or substantially similar components of the sub-assemblies not specifically discussed with respect to FIGS. 11 and 12 are shown in FIGS. 11 and 12 with the same reference numbers as used in FIGS. 9 and 10.

Optionally, and with reference to FIGS. 13 and 14, a display element or device 422" of a mirror reflective element sub-assembly 412" is operable to provide a display or indication at the reflective element for viewing the display or indication through the mirror reflective element. Display device 422" is disposed at a display receiving portion 430" (such as a corner portion or region, such as an upper outside/far quadrant or corner portion or region that is at the outer side of the reflective element and away from the vehicle at which the mirror assembly is mounted) of the back plate 420" and is located at a perimeter region of the reflective element sub-assembly so as to be operable to emit light outside of the perimeter of the reflective element 418" and not through the reflective element 418", such as in a similar manner as described above.

In the illustrated embodiment of FIGS. 13 and 14, display receiving portion 430" has a rear surface 430a" that is generally parallel to front surface 430b" and to the front surface of the reflective element 418". Display receiving portion 430" includes one or more curved passageways 430c" established therethrough for guiding and directing light emitted by illumination sources or LEDs 434" so that the emitted light 434a" is directed outward and away from the body side of the host vehicle. The circuitry element 432" and LEDs 434" may be located or established at the rear surface of the display receiving portion in a similar manner as described above with respect to display device 422, or optionally may include a light control film such as described above with respect to display device 422', while remaining within the spirit and scope of the present invention. Further, the display device may include a light transmitting lens cover or cover element 438" at a front surface 430b" of display receiving portion 430", such as a cover element that substantially covers and seals the front surface of the display receiving portion and the passageways, such as in a similar manner as described above with respect to display device 422'.

Thus, the curved passageways 430c" of opaque display receiving portion 430" function to curve or direct the light 434a" emitted by the LEDs 434" in the desired or appropriate direction as the light passes through the cover element 438", so that the light 434a" is directed generally away from the body side of the host vehicle and is not readily viewable by the driver of the host vehicle. The LEDs 434" and circuit element 432" thus may be located at a flat or non-angled or non-canted rear surface 430a" of display receiving portion 430", whereby the curved passageways 430c" provide the desired guidance and directing of the light emitted by the LEDs 434". The angle of curvature of the passageways may be selected to provide the desired angle of the light path as the light exits the display portion and passes through the cover element 438". Mirror reflective element sub-assembly 412" may otherwise be substantially similar as mirror reflective element sub-assembly 412 or 412' described above, such that a detailed discussion of the mirror reflective element sub-assemblies need not be repeated herein. The common or substantially similar components of the sub-assemblies not specifically discussed with respect to FIGS. 13 and 14 are shown in FIGS. 13 and 14 with the same reference numbers as used in FIGS. 9 and 10.

In the illustrated embodiments of FIGS. 9-14, the mirror sub-assembly includes a display device for a turn signal indicator (with the light beam projected by or emanating from the display device being directed away from the vehicle as it exits the mirror element sub-assembly and away from direct view of the driver of the host vehicle so that the driver is not unduly bothered by glare from the light sources at night), but the mirror sub-assembly could also or otherwise include a display device for a blind spot detection system or LCA system (where the passageways may be angled to emit light generally toward the vehicle so as to be readily viewable by the driver of the host vehicle so the driver principally sees the light emanating from the indicator while the light is not directly viewed by drivers of other vehicles). Optionally, the mirror assembly could include two display devices for providing both a display for a blind spot/LCA indicator and a display for a turn signal indicator, while remaining within the spirit and scope of the present invention.

Figure 15:
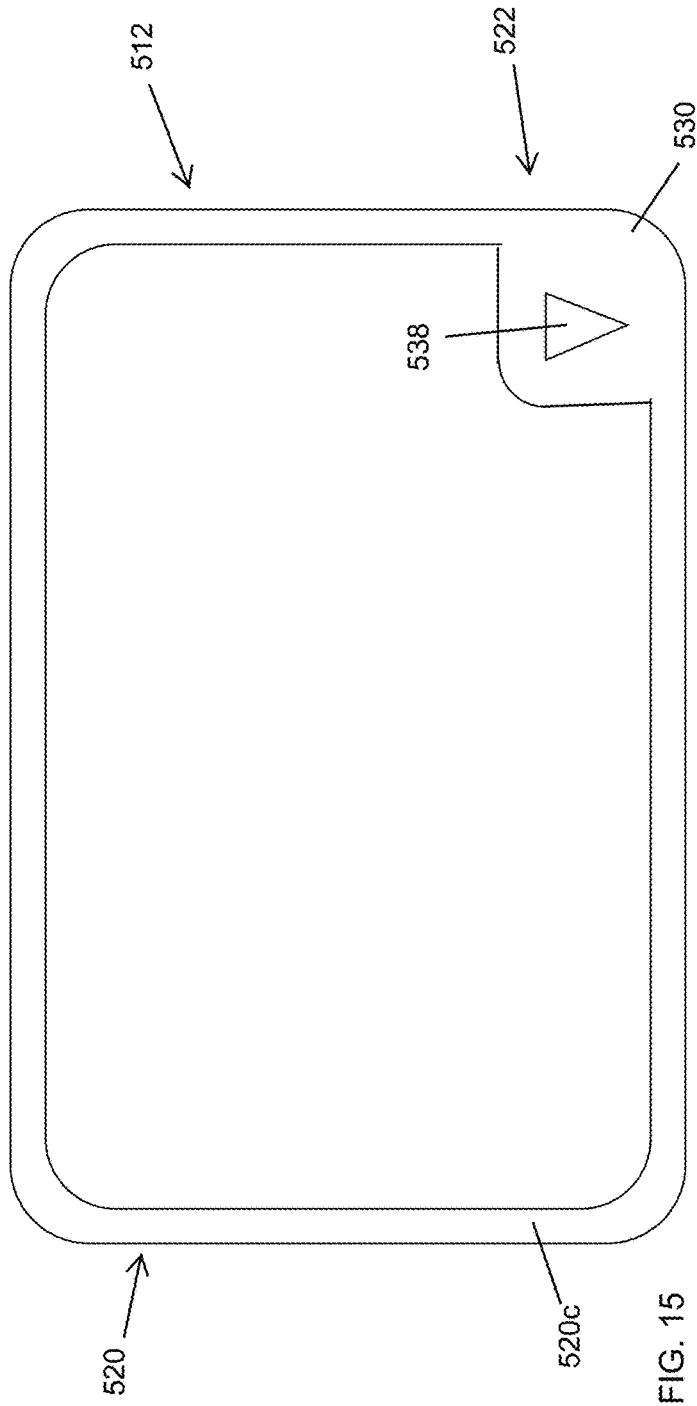
FIG. 15 is a view of another exterior mirror reflector sub-assembly with a display device or indicator in accordance with the present invention, shown as viewed in the direction of travel of the vehicle.
Figure 16:
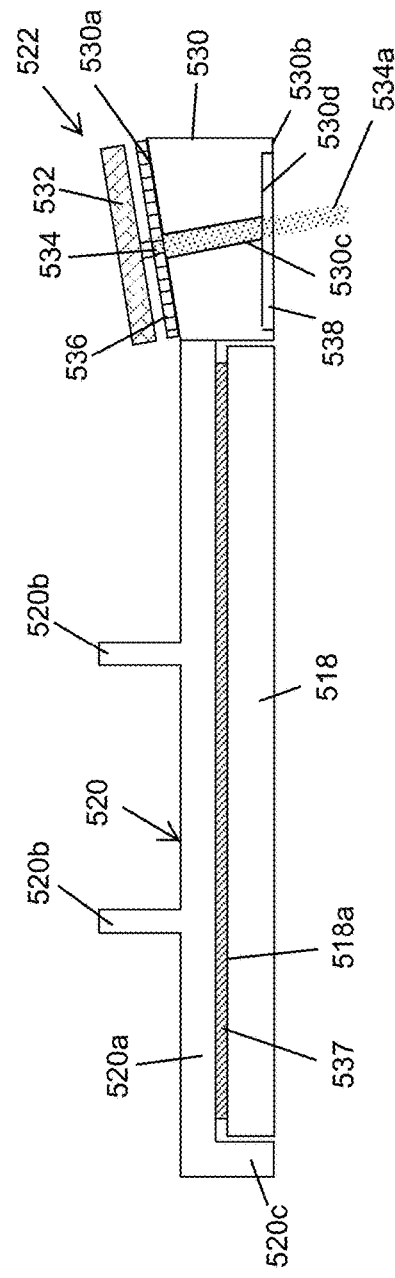
FIG. 16 is a sectional view of the mirror reflector sub-assembly of FIG. 15.

For example, and with reference to FIGS. 15 and 16, a mirror reflective element sub-assembly 512 includes a mirror reflective element 518 and a mirror reflector carrier or back plate 520 attached to or mounted to or adhered to a rear surface 518a of mirror reflective element 518. The mirror reflector sub-assembly 512 includes a display element or device or blind spot indicating device 522 that is operable to provide a display or indication at the reflective element for viewing the display or indication through the mirror reflective element, such as in a similar manner as described above. Display element or device 522 is disposed at a display receiving portion 530 (such as a corner portion or region, such as a lower inside/near quadrant or corner portion or region that is at the inner side of the reflective element and toward the body side of the host vehicle at which the mirror assembly is mounted) of the back plate 520 and is located at a perimeter region of the reflective element sub-assembly so as to be operable to emit light outside of the perimeter of the reflective element 518 and not through the reflective element 518.

Back plate 520 is molded or formed so as to provide the display receiving portion 530 and a generally planar backing portion 520a that attaches to the rear surface of the reflective element (such as via adhesive or other suitable attachment means). Preferably, back plate 520, including display receiving portion 530, is molded of a substantially dark or opaque or black material so as to be substantially opaque such that light does not pass through the opaque back plate and display portion. An attachment element or elements 520b may be formed or established at the rear of the backing portion 520a for attaching the back plate 520 and reflective element to a mirror actuator, such as a mirror actuator as known in the art and/or as described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and 5,900,999, which are hereby incorporated herein by reference herein in their entireties.

Optionally, a heater pad 537 may be provided at the rear surface 518a of the reflective element 518 and between the backing portion 520a of back plate 520 and the reflective element to provide an anti-fogging of de-fogging feature to the exterior mirror assembly (such as by utilizing aspects of the heater elements or pads described in U.S. patent application Ser. No. 11/334,139, filed Jan. 18, 2006, now U.S. Pat. No. 7,400,435, which is hereby incorporated herein by reference in its entirety). Back plate 520 may include a perimeter framing portion or bezel portion 520c that extends around the perimeter edges of the reflective element 518 to support the reflective element and frame the reflective element at the mirror assembly.

Display receiving portion 530 of back plate 520 is formed or established at the inner and lower corner or quadrant of the reflective element sub-assembly 512 so as to be readily viewable by the driver of the host vehicle. As shown in FIGS. 15 and 16, display receiving portion 530 may be received at a corner region or cut-out region of the reflective element 518 so as to be viewable outside of the reflective element and not through the reflective element. As shown in FIG. 16, a rear surface 530a of display receiving portion 530 may be angled or canted or slanted and may receive or support a circuit board or element 532 thereat or thereon, while a front surface 530b may be generally flush with the front or outer surface 518b of the reflective element (the surface that faces rearward when the mirror assembly is mounted at the vehicle). Circuit element 532 includes one or more illumination sources or LEDs 534 that emit light along and through passageways 530c established through display receiving portion 530, such as in a similar manner as described above.

As shown in FIG. 16, display element or device 522 includes a light control film 536 (such as a light control film of the types described above with respect to display element 422') established or disposed between the rear surface 530a of display receiving portion 530 and the LEDs 534 and circuit element 532. For example, the light control film 536 may be disposed or adhered otherwise attached at the rear surface 530a so that light 534a that is emitted by LEDs 534 is directed through the light control film 536 and through the passageways 530c established through display receiving portion 530. Light control film 536 may comprise any suitable film and may function as microlouvers, so as to preferentially direct light that is received from one angle whereby the light is redirected or controlled to another direction (such as the films of the types described in PCT Application No. PCT/US2006/018567, filed May 15, 2006 and published Nov. 23, 2006 as International Publication No. WO 2006/124682, which is hereby incorporated herein by reference in its entirety). An example of a suitable light control film or material is disclosed in U.S. Pat. No. 5,481,409 (which is hereby incorporated herein by reference in its entirety), and may comprise a light control film manufactured by the 3M Company of Minn., such as the light control film commercially available under the trade name LCF-P (light control film-polycarbonate), such as discussed above.

Further, display device 522 includes a light transmitting lens cover or cover element 538 that covers and substantially seals the passageways 530c at the front surface 530b of display receiving portion 530 to limit or substantially preclude dirt, debris, water and other elements and/or contaminants from being received at the outer ends of the passageways so as to keep the passageways clear and to protect and seal the electronic circuitry at the rear of the display portion. The cover element thus may seal or substantially seal the display element and display receiving portion to make the display device substantially water impervious and substantially impervious to other elements, such as dirt, debris and the like. Cover element 538 may comprise a substantially transparent or clear cover element or may be tinted (such as red-tinted or amber-tinted) to provide a desired or appropriate color or tint to the light passing therethrough. As can be seen with reference to FIGS. 15 and 16, cover element 538 may comprise a desired shape or form, such as a triangular form or shape or other suitable indicating shape or the like, while the LEDs 534 and passageways 530c may function to illuminate and project light through the cover element 538. Optionally, the cover element 538 may comprise an optical lens element with light directing properties configured to direct the light passing therethrough away from the bodyside of the host vehicle so as to be generally not viewable by the driver of the host vehicle. Optionally, cover element 538 may be received in a recess 530d formed or established at the front surface 530b of display receiving portion 530. The angle of the rear surface 530a of display portion and/or of the passageways 530c, and of the microlouvers or other optical guiding elements, may be selected to provide the desired angle of the light path as the light exits the display receiving portion and passes through the cover element 538, depending on the particular application of the display device and mirror reflective element sub-assembly.

In the illustrated embodiment, the passageways 530c are angled through display receiving portion 530 and are generally normal to circuit element 532. As can be seen in FIG. 16, the passageways 530c are angled inward and toward the host vehicle and toward the driver of the host vehicle. The illumination sources or LEDs 534 are located at circuit element 532 and at or near the end of passageways 530c so that light 534a emitted by LEDs 534 is emitted through passageways 530c and toward the view of the driver of the host vehicle sitting in the vehicle cabin. The angle of the rear surface and/or the passageways may be selected to provide the desired angle of the light path as the light exits the display receiving portion, depending on the particular application of the display device and reflective element sub-assembly. The passageways or slots may be established to provide the desired indicator form or shape (such as an alert or warning shape or other suitable shape or form), and may be readily viewable and discernible and recognizable when the indicators or LEDs are activated. Because the back plate 520 and display receiving portion 530 of back plate 520 are substantially opaque, the passageways and indicators are not readily viewable and discernible when the indicators or LEDs are deactivated.

Thus, the blind spot indicator or display element or device 522 provides an indication of a detection of an object or vehicle in the "blind spot" of the host vehicle (such as at the driver side of the vehicle and partially rearward of the vehicle). The blind spot indicator 522 thus may provide an alert or indication (via activation of the LEDs 534) to alert the driver of the vehicle as to the detected presence of an object or vehicle in the adjacent lane, such as may be detected by such systems including a radar detector or an ultrasonic detector or a camera detector or the like. The blind spot indicator device may be operable in conjunction with any suitable side object detection system or blind spot alert system or the like, such as by utilizing aspects of the systems and/or devices discussed below. Optionally, the mirror reflective element sub-assembly 512 may also include a turn signal indicator at an outer corner or quadrant of the reflective element, such as described above.

Optionally, and with reference to FIGS. 17 and 18, a display element or device 622 of a mirror reflective element sub-assembly 612 includes a turn signal indicating element or device 622a and a blind spot indicating element or device 622b for providing both a turn signal indicator and display area or icon or indicator 623a and an object in a blind spot/LCA indicator and display area or indicator 623b, respectively. Display device 622 is disposed at a display receiving portion 630 (such as a corner portion or region, such as an upper outside/far quadrant or corner portion or region that is at the outer side of the reflective element and away from the body side of the host vehicle at which the mirror assembly is mounted) of the back plate 620 and is located at a perimeter region of the reflective element sub-assembly so as to be operable to emit light outside of the perimeter of the reflective element 618 and not through the reflective element 618. As can be seen in FIG. 18, display device 622a is angled outward so as to direct illumination or light outward and away from the body side of the host vehicle for displaying a turn signal indicator, such as in a similar manner as described above with display devices 422, 422', 422", while display device 622b is angled inward so as to direct illumination or light inward and toward the body side of the host vehicle for displaying a blind spot detection indicator, such as in a similar manner as described above with respect to display device 522.

As shown in FIG. 18, display receiving portion 630 is formed as part of the back plate 620, such as in a similar manner as described above. A rear surface 630a of display receiving portion 630 is generally V-shaped, with an outward angled display receiving portion 630a' and an inward angled display receiving portion 630a". Each angled portion 630a', 630a" includes or receives or supports a respective circuit element or circuit board 632 (optionally, a single circuit element or circuit board may be established at and across the angled portions 630a', 630a"), with one or more illumination sources or LEDs 634a, 634b established at the circuit element or elements for emitting light through a respective passageway or passageways 630c', 630c" of display receiving portion 630. Each display device 622a, 622b may include a light directing film 636a, 636b, such as described above, and/or a lens cover or cover element 638 (which may comprise separate cover elements or may comprise a single cover element across the display portion) to substantially seal the passageways 630c', 630c" of display receiving portion 630, such as described above.

Thus, display device 622a is operable to activate LED or LEDs 634a, which emits light 635a through light directing film 636a and along passageway or passageways 630c' of display receiving portion 630 and through cover element 638, so that the LEDs emit light in a direction outward and away from the body side of the host vehicle so that the light is readily viewable by a driver of a vehicle at the side and/or rearward of the host vehicle. Similarly, display device 622b is operable to activate LED or LEDs 634b, which emits light 635b through light directing film 636b and along passageway or passageways 630c" of display receiving portion 630 and through cover element 638, so that the LEDs emit light in a direction inward and toward the body side of the host vehicle so that the light is readily viewable by the driver of the host vehicle.

As shown in FIG. 17, the display indicators or areas of the display receiving portion 630 and display device 622 may be selected to be a desired or appropriate shape or form for their respective functions. For example, a display indicator 623a for display device or turn signal indicator device 622a may comprise an arrow or chevron shape or a triangle shape with a tip pointing outward away from the vehicle or other suitable turn signal indicator shape, while a display indicator 623b for display device or blind spot indicator device 622b may comprise a triangular shape with a tip pointing downward or may comprise any other suitable shape or indicator or icon, such as the indicator shown in FIG. 1 or such as other suitable blind spot detection or LCA indicators or icons, such as those described in PCT Application No. PCT/US2006/026148, filed Jul. 5, 2006 and published Jan. 11, 2007 as International Publication No. WO 2007/005942, which is hereby incorporated herein by reference in its entirety.

Thus, the display elements or devices of the present invention provide a desired or appropriate iconistic display that, when electrically actuated, emits light that is not directed through the mirror reflective element. The display element may be formed with the back plate or may attach to the back plate (such as by snapping to the back plate or the like), and provides the desired angle effect relative to the reflective element. For example, the reflective element may be attached to or snapped into the back plate (which includes the display element at a perimeter region thereof), whereby the display element is thus positioned at a desired or appropriate angle relative to the reflective element to provide the desired or appropriate angle effect for directing the light from the light sources (when electrically actuated) in a desired or predetermined angle relative to the mirror reflective element. Thus, the display element provides the desired or appropriate preset angle when the mirror reflective element is attached to the back plate.

The blind spot indicators of the present invention thus provide a display element or indicator that is disposed at or integrally provided with the back plate. A back plate thus may be provided to a mirror manufacturer with mounting or attachment structure or receiving structure for the display element or display circuitry integrally formed with the back plate. The attachment structure or receiving portion is configured to receive or attach to a display element or display circuitry or indicator element. A mirror assembler or manufacturer may attach the display element to the attachment structure or receiving portion of the back plate (such as by snapping display circuitry or a circuit board at the attachment structure), whereby the display element is oriented at a desired angle relative to the mirror reflective element when attached to the back plate. Thus, illumination emanating from the display element is directed at the desired or appropriate angle for viewing, either by the driver of the host vehicle (for a blind spot detection system) or a driver of another vehicle (for a turn signal indicator).

The blind spot indicators of the present invention thus are operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786 and/or 5,786,772, and/or U.S. patent application Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional applications, Ser. No. 60/638,687, filed Dec. 23, 2004; Ser. No. 60/628,709, filed Nov. 17, 2004; Ser. No. 60/614,644, filed Sep. 30, 2004; and/or Ser. No. 60/618,686, filed Oct. 14, 2004, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 and/or 6,757,109, and/or U.S. patent application Ser. No. 10/418,486, filed Apr. 18, 2003, now U.S. Pat. No. 7,005,974, and/or of the automatic headlamp controls described in U.S. Pat. Nos. 5,796,094 and/or 5,715,093; and/or U.S. patent application Ser. No. 11/105,757, filed Apr. 14, 2005, now U.S. Pat. No. 7,526,103; and/or U.S. provisional application Ser. No. 60/607,963, filed Sep. 8, 2004, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999, now U.S. Pat. No. 7,339,149, and/or PCT Application No. PCT/US2003/036177, filed Nov. 14, 2003 and published Jun. 3, 2004 as International Publication No. WO 2004/047421, with all of the above referenced U.S. patents, patent applications and provisional applications and PCT applications being commonly assigned and being hereby incorporated herein by reference in their entireties.

Optionally, the indicator or indicators of the present invention may alert the driver of the host vehicle of other situations or status or the like. For example, the indicator could function to alert the driver of the host vehicle that the brake lights of the host vehicle are functioning properly. Other applications or uses of the indicator may be implemented, without affecting the scope of the present invention.

The reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; and/or Ser. No. 11/226,628, filed Sep. 14, 2005 and published Mar. 23, 2006 as U.S. Publication No. US-2006-0061008, and/or U.S. provisional applications, Ser. No. 60/695,149, filed Jun. 29, 2005; Ser. No. 60/690,400, filed Jun. 14, 2005; Ser. No. 60/681,250, filed May 16, 2005; and/or Ser. No. 60/692,113, filed Jun. 20, 2005, which are all hereby incorporated herein by reference in their entireties, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854 and 6,420,036, and in PCT Application No. PCT/US03/29776, filed Sep. 9, 2003 and published Apr. 1, 2004 as International Publication No. WO 2004/026633, which are all hereby incorporated herein by reference.

Optionally, use of an elemental semiconductor mirror, such as a silicon metal mirror, such as disclosed in U.S. Pat. Nos. 6,286,965; 6,196,688; 5,535,056; 5,751,489 and 6,065,840, and/or in U.S. patent application Ser. No. 10/993,302, filed Nov. 19, 2004, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in PCT Application No. PCT/US03/29776, filed Sep. 19, 2003 and published on Apr. 1, 2004 as International Publication No. WO 2004/026633; and/or PCT Application No. PCT/US03/35381, filed Nov. 5, 2003 and published May 21, 2004 as International Publication No. WO 2004/042457; and/or U.S. patent application Ser. No. 11/021,065, filed Dec. 23, 2004, now U.S. Pat. No. 7,255,451; and/or Ser. No. 11/226,628, filed Sep. 14, 2005 and published Mar. 23, 2006 as U.S. Publication No. US-2006-0061008; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference. Optionally, the reflective element may include indicia formed at and viewable at the reflective element, such as by utilizing aspects of the reflective elements described in PCT Application No. PCT/US2006/018567, filed May 15, 2006 and published Nov. 23, 2006 as International Publication No. WO 2006/124682; and U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006, which are all hereby incorporated herein by reference in their entireties.

Optionally, the reflective element may comprise a single substrate with a reflective coating at its rear surface, without affecting the scope of the present invention. The mirror assembly thus may comprise a prismatic mirror assembly or other mirror having a single substrate reflective element, such as a mirror assembly utilizing aspects described in U.S. Pat. Nos. 6,318,870; 6,598,980; 5,327,288; 4,948,242; 4,826,289; 4,436,371 and 4,435,042; and PCT Application No. PCT/US04/015424, filed May 18, 2004 and published Dec. 2, 2004, as International Publication No. WO 2004/103772; and U.S. patent application Ser. No. 10/933,842, filed Sep. 3, 2004, now U.S. Pat. No. 7,249,860, which are hereby incorporated herein by reference in their entireties. Optionally, the reflective element may comprise a conventional prismatic or flat reflective element or prism, or may comprise a prismatic or flat reflective element of the types described in PCT Application No. PCT/US03/29776, filed Sep. 19, 2003 and published Apr. 1, 2004 as International Publication No. WO 2004/026633; U.S. patent application Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2004, now U.S. Pat. No. 7,338,177, and/or PCT Application No. PCT/US2004/015424, filed May 18, 2004 and published Dec. 2, 2004, as International Publication No. WO 2004/103772, which are all hereby incorporated herein by reference in their entireties, without affecting the scope of the present invention.

Optionally, the mirror assembly may include one or more displays, such as the types disclosed in U.S. Pat. Nos. 5,530,240 and/or 6,329,925, which are hereby incorporated herein by reference, and/or display-on-demand or transflective type displays, such as the types disclosed in U.S. Pat. Nos. 6,690,268; 5,668,663 and/or 5,724,187, and/or in U.S. patent application Ser. No. 10/054,633, filed Jan. 22, 2002, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; and/or Ser. No. 11/021,065, filed Dec. 23, 2004, now U.S. Pat. No. 7,255,451; and/or PCT Application No. PCT/US03/29776, filed Sep. 9, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/042457; and/or U.S. provisional applications, Ser. No. 60/630,061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; and Ser. No. 60/563,342, filed Apr. 19, 2004, and/or PCT Application No. PCT/US03/40611, filed Dec. 19, 2003 and published Jul. 15, 2004 as International Publication No. WO 2004/058540, which are all hereby incorporated herein by reference in their entireties, or may include or incorporate video displays or the like, such as the types described in PCT Application No. PCT/US03/40611, filed Dec. 19, 2003 and published Jul. 15, 2004 as International Publication No. WO 2004/058540, and/or U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005, now U.S. Pat. No. 7,370,983; and/or U.S. provisional applications, Ser. No. 60/630,061, filed Nov. 22, 2004; and Ser. No. 60/667,048, filed Mar. 31, 2005, which are hereby incorporated herein by reference in their entireties.

Optionally, the display may be associated with a navigation system and/or a telematics system of the vehicle, such as, for example, an ONSTAR® system as found in General Motors vehicles and/or such as telematics systems and/or navigation systems such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,946,978; 6,477,464; 6,678,614 and/or 7,004,593, and/or U.S. patent application Ser. No. 10/645,762, filed Aug. 20, 2003, now U.S. Pat. No. 7,167,796; Ser. No. 10/964,512, filed Oct. 13, 2004, now U.S. Pat. No. 7,308,341; Ser. No. 10/538,724, filed Jun. 13, 2005 and published Mar. 9, 2006 as U.S. Publication No. US-2006-0050018; Ser. No. 11/284,543, filed Nov. 22, 2005, now U.S. Pat. No. 7,370,983; and/or Ser. No. 10/529,715, filed Mar. 30, 2005, now U.S. Pat. No. 7,657,052, which are all hereby incorporated herein by reference in their entireties.

Thus, the display (such as a video display and such as a slide-out video display of the types described in U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005, now U.S. Pat. No. 7,370,983, which are hereby incorporated herein by reference in their entireties, or such as display on demand transflective display such as those described above) may display directional instructions or information (and may activate or slide-out at an appropriate time for displaying such directional instructions) as the vehicle approaches waypoints along a set or selected navigational route. Optionally, a telematics system (such as ONSTAR® or the like) may provide audible instructions to provide step-by-step vocal instructions to the driver of the vehicle as the vehicle is driven along the set route. For example, an operator at a remote service center may, after receiving instructions from the driver of the vehicle (such as a request for turn-by-turn or other directions for the driver to follow from the location where the driver and vehicle are to a targeted location or destination), provide step-by-step vocal directions to the driver's vehicle via the telematics system. The vehicle-based control or system may digitally record the step-by-step vocal instructions (or the directions may be downloaded to the vehicle-based system), and the audio directions (as keyed or corresponding to specific waypoints along the route) may then be played automatically through the vehicle's speakers of the vehicle's audio system or through other speakers, such as when the vehicle approaches the specific waypoints along the set or selected route (as may be determined by a vehicle-based global positioning system).

Optionally, the display or video display may provide visible step-by-step directional or navigational instructions along the route (such as by utilizing aspects of the systems described in U.S. patent application Ser. No. 10/645,762, filed Aug. 20, 2003, now U.S. Pat. No. 7,167,796; Ser. No. 10/538,724, filed Jun. 13, 2005 and published Mar. 9, 2006 as U.S. Publication No. US-2006-0050018; and/or Ser. No. 11/284,543, filed Nov. 22, 2005, now U.S. Pat. No. 7,370,983, which are all hereby incorporated herein by reference in their entireties). Such a display (preferably a display on demand transflective display or through-the-mirror display that displays or projects or emits display information through the mirror reflective element for viewing by the driver of the vehicle) may be activated as the vehicle approaches the next waypoint so that the next turn instruction is displayed only when the vehicle approaches or is proximate to the next waypoint, and then may be deactivated (so that the display may "disappear" or no be longer viewable by the driver of the vehicle) after the waypoint is passed (and then may reappear or reactivate again as the vehicle approaches the next waypoint).

In applications where the display is located behind the mirror reflector of the interior rearview mirror assembly and is operable as a display on demand transflective display, the display may be activated to be viewed through the reflective element and, when the display is deactivated, the mirror functions as a normal reflective mirror to provide a normal rearward field of view to the driver of the vehicle. Such a display on demand transflective display thus provides a covert display that is viewable only when activated and thus only during times when it is appropriate or desired to view the display, and is substantially non-viewable or non-visible at other times.

Optionally, the turn-by-turn or step-by-step display may be associated with or may supplement the audible message from the telematics system operator. This may be beneficial since some drivers or consumers may feel that such audible or vocal turn-by-turn or step-by-step instructions are intrusive to conversations or music listening or the like, and may be "nagging", if continually repeated as the driver approaches each turn or waypoint. Thus, the driver may elect to have the audible instructions or visible display instructions or both during the navigational sequence. The display may display a written text message (such as a text message of the vocal instruction) pertaining to the next instruction (such as "turn left at next intersection" or "take right fork ahead" or "take exit 98" or "turn right on Woodward Avenue" or the like) or may display a graphic or iconistic display (such as a turn arrow or a cross-street map or the like) at the appropriate time corresponding to the vehicle approaching the next waypoint or turn (and/or at an appropriate distance from the next waypoint or turn) along the route (and corresponding to the next vocal or audible message as provided by the remote operator of the telematics system, such as ONSTAR® or the like). Optionally, the distance or time before the waypoint or turn at which the display is activated may vary depending on the speed of the vehicle or other parameters, such as weather or driving or traffic conditions or the like. It is envisioned that the audible or vocal message could be played or communicated once as the vehicle approaches the next waypoint (such as when the vehicle is a predetermined distance or time until arrival at the next waypoint), and the visible display may provide the iconistic display or textual display during the time that elapses between the audible or vocal message and the arrival at the waypoint by the vehicle.

The visible iconistic or textual display/message thus may supplement and/or complement the audio or vocal message. The display system and navigation system thus may receive and process the information provided by ONSTAR® or the like (such as information data and/or vocal message/recording that corresponds to or is coded to a set of parameters that corresponds to and/or defines particular geographical locations or waypoints, such as degrees longitude and latitude of the geographical locations or waypoints), whereby the audible message may be triggered or activated as the vehicle approaches the next waypoint, and the visible message may supplement or complement the audible message. Optionally, the visible information may be displayed without the audible message, which may be particularly appreciated by deaf or hearing impaired drivers.

Optionally, when the display on demand transflective display is not displaying the directional instructions/information (such as between waypoints along the set route), it may be desirable to have the display continue to display other information, such as a compass directional heading display or the like (such as a compass display associated with a compass system of the types described in U.S. Pat. Nos. 7,004,593; 5,924,212; 4,862,594; 4,937,945; 5,131,154; 5,255,442 and/or 5,632,092, and/or U.S. patent application Ser. No. 11/305,637, filed Dec. 16, 2005, now U.S. Pat. No. 7,329,013, which are all hereby incorporated herein by reference in their entireties). In such a situation, it is envisioned that a backlit display (such as a backlit LCD display of the types described in U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005, now U.S. Pat. No. 7,370,983, which are hereby incorporated herein by reference in their entireties) may have some of the backlighting deactivated (such as a portion or zone of the backlighting that backlights the directional instructions provided at the video LCD display element or monitor), while one or more other portions or elements or zones of the backlighting are activated, so as to continue displaying other information (such as compass directional heading information or icons or characters or the like). For example, with a backlighting device or element that comprises a plurality of illumination or light sources that are operable to backlight a LCD video display (such as a backlit LCD display of the types described in U.S. patent application Ser. No. 11/284,543, filed Nov. 22, 2005, now U.S. Pat. No. 7,370,983, which is hereby incorporated herein by reference in its entirety), a zone or region of the backlighting device comprising a plurality of adjacent light sources (such as light emitting diodes (LEDs) or the like) may be activated to backlight a corresponding zone or region of the LCD display, while other zones or regions of the backlighting device may be deactivated so as to not backlight the corresponding zones or regions of the LCD display (and thus not displaying information at those zones or regions, even if the LCD display is fully activated).

Thus, if it is desired to not have the entire backlighting device lit or activated, the display may be operable to activate or light a small area (such as about 1 cm$^2$ or thereabouts, or smaller or larger if desired) to backlight compass directional heading information of the display. Thus, the backlighting device or element may be selectively or differentially activated to provide the desired display on demand transflective display at the mirror reflective element, while not displaying other portions of the display when those other portions are not desired to be viewed by the driver. Although described as selectively or differentially activating portions or zones or elements or regions of the display to display directional instructions or information and compass information, it is envisioned that a backlighting element or device of a display may be differentially activated to selectively illuminate or backlight other display portions or display information, such as display information pertaining to a vehicle status (such as a low fuel indicator or oil change indicator or the like) or a telephone or telematics system status or function, or any other suitable display at the interior rearview mirror assembly of the vehicle, while remaining within the spirit and scope of the present invention. As disclosed in U.S. patent application Ser. No. 10/054,633, filed Jan. 22, 2002, now U.S. Pat. No. 7,195,381, depending on the application, LEDs emitting a colored light can be used, such as high intensity amber and reddish orange light emitting diode sources, such as solid state light emitting diode LED sources utilizing double hydro junction AlGaAs/GaAs Material Technology, such as very high intensity red LED lamps (5 mm) HLMP-4100/4101 available from Hewlett Packard Corporation of Palo Alto, Calif., or transparent substrate aluminum indium gallium phosphide (AlInGaP) Material Technology, commercially available from Hewlett Packard Corporation of Palo Alto, Calif. Also, blue can be used, or a combination of individual different colored diodes, such as red, blue, white, green, amber, orange etc. can be used with color mixing thereof to form a desired color or to deliver a desired local intensity of illumination as noted above. Other suitable white emitting light-emitting diodes are available from Nichia Chemical Industries of Tokyo, Japan and from Cree Research Inc., of Durham, N.C. For example, a white light emitting diode is available from Nichia Chemical Industries of Tokyo, Japan under Model Nos. NSPW 300AS, NSPW 500S, NSPW 310AS, NSPW 315AS, NSPW 510S, NSPW 515S and NSPW WF50S, such as is disclosed in U.S. patent application Ser. No. 09/448,700, filed Nov. 24, 1999, now U.S. Pat. No. 6,329,925, and in U.S. patent application Ser. No. 09/244,726, filed Feb. 5, 1999, now U.S. Pat. No. 6,172,613, the entire disclosures of which are hereby incorporated by reference herein. A variety of constructions are used including GaAsP on GaP substrate, gallium aluminum phosphide, indium gallium nitride, and GaN on a SiC substrate. Optionally, a plurality of LEDs such as a cluster of two, three, four, six, eight or the like LEDs (each of the same color or the cluster comprising different colored LEDs) can be used to target and illuminate a local area for higher illumination at that area, such as may be useful in a map light or as a reading light or as an interior light or as an illumination source for an interior vehicle cabin-mounted and monitoring camera (most preferably illuminating the target area with white light). Such a cluster of high efficiency LEDs can be mounted at the mirror mount so as to project an intense pattern of light generally downwardly into the vehicle cabin for purposes of map reading, general illumination, courtesy illumination and the like. Also, a cluster of LED's, preferably including at least one white emitting LED and/or at least one blue emitting LED, can be mounted in a roof portion, side portion or any other portion of the vehicle cabin to furnish dome lighting, rail lighting, compartment lighting and the like. Use of white emitting LEDs is disclosed in U.S. Pat. No. 6,152,590, the entire disclosure of which is hereby incorporated by reference herein.

Other suitable LEDs may include high-intensity, high current capability light emitting diodes such as the high-flux power LEDs available from LumiLeds Lighting, U.S., LLC of San Jose, Calif. under the SunPower Series High-Flux LED tradename. Such high-intensity power LEDs comprise a power package allowing high current operation of at least about 100 milliamps forward current, more preferably at least about 250 milliamps forward current, and most preferably at least about 350 milliamps forward current through a single LED. Such high current/high-intensity power LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. Such high intensity power LEDs are available in blue, green, blue-green, red, amber, yellow and white light emitting forms, as well as other colors. Such high-intensity LEDs can provide a wide-angle radiation pattern, such as an about 30 degree to an about 160 degree cone. Such high-intensity power LEDs, when normally operating, emit a luminous flux of at least about 1 lumen, more preferably at least about 5 lumens and most preferably at least about 10 lumens. For certain applications such as ground illumination from lighted exterior mirror assemblies and interior mirror map lights, such high-intensity power LEDs preferably conduct at least about 250 milliamps forward current when operated at a voltage in the about 2 volts to about 5 volts range, and emit a luminous flux of at least about 10 lumens, more preferably at least about 15 lumens and most preferably at least about 25 lumens, preferably emitting white light. Typically, such high-intensity power LEDs are fabricated using Indium Gallium Nitride technology. However, to maintain the low temperatures associated with lower-intensity LEDs, for example below about 130 degrees Celsius, more preferably below about 100° Celsius, and most preferably below about 70 degrees Celsius, a heat sink can be incorporated into incandescent light source unit 16. Preferably such a heat sink comprises a metal heat dissipater (such as an aluminum metal heat sink) with a surface area dissipating heat of at least about 1 square inch, more preferably of at least about 2.5 square inches, and most preferably of at least about 3.5 square inches. Further details of suitable heat sinks are described in U.S. Pat. No. 7,195,381 in reference to the embodiments depicted in FIGS. 25-27 and 30-33 of U.S. Pat. No. 7,195,381. When used as, for example, a map/reading light assembly for an interior mirror assembly (such as in the mirror housing or in a pod attaching to the mirror mount to the vehicle), a single high-intensity power LED (for example, a single white light emitting power LED passing about 350 mA and emitting white light with a luminous efficiency of at least about 3 lumens per watt, and with a light pattern of about 120 degrees or so) can be used. As noted above, though not required, such a light source may be combined with a reflector element and a lens to form a high-intensity power LED interior light module capable of directing an intense white light beam of light from the interior mirror assembly to the lap area of a driver or a front-seat passenger in order to allow a reading function, such as a map reading function and/or to provide courtesy or theatre lighting within the vehicle cabin.

For example, and such as described in U.S. Pat. No. 6,916,100, incorporated above, the lens may be an optical lens and may comprise a segmented lens, a prismatic lens, or a Fresnel lens in order to generate the desired light pattern and may use diffractive optics or refractive optics or their combination.

Optionally, the mirror assembly may include an imaging device, such as an imaging array sensor for imaging systems of the types described in U.S. Pat. Nos. 6,757,109; 6,717,610; 6,396,397; 6,201,642; 6,353,392; 6,313,454; 6,396, 397; 5,550,677; 5,670,935; 5,796,094; 5,877,897; 6,097,023 and 6,498,620, and U.S. patent application Ser. No. 09/441,341, filed Nov. 16, 1999, now U.S. Pat. No. 7,339,149, and Ser. No. 10/427,051, filed Apr. 30, 2003, now U.S. Pat. No. 7,038,577, which are all hereby incorporated herein by reference in their entireties.

Such displays and imaging systems may be associated with a night vision system. Night vision systems are known in the vehicle imaging art and typically capture images of or data representative or indicative of a forward scene and display or show the captured images to the driver to alert the driver as to what is ahead of or in the path of the vehicle. However, the driver has to look at the display and distinguish what the images are that are captured by the night vision system.

Optionally, a night vision system may include a forward facing sensor that detects or senses objects in a forward field of view ahead of the vehicle as the vehicle travels along the road. For example, a night vision system may include a passive forward facing sensor, such as a far infrared or thermal sensor or imager or the like, or an active forward facing sensor, such as a near infrared sensor or infrared sensor that captures images of the forward scene as illuminated or flooded by near infrared or infrared light emitting diodes (LEDs) or laser diodes or the like. Such near infrared or infrared energy sources may substantially flood the forward scene with infrared or near infrared energy to enhance the imaging or capturing of image data by a forward facing sensor (which may be at the interior rearview mirror assembly or a windshield electronics module or accessory module or the like, with a forward field of view through the windshield of the vehicle, and which is selected to be sensitive to such infrared or near infrared energy) while limiting or substantially precluding glare to the driver of the host vehicle and other vehicles approaching the host vehicle. An output of the forward facing sensor is fed to or communicated to a processor or control (such as an image processor of the types described in U.S. Pat. No. 7,038,577 and/or U.S. patent application Ser. No. 11/408,776, filed Apr. 21, 2006, now U.S. Pat. No. 7,463,138; and/or Ser. No. 11/315,675, filed Dec. 22, 2005, now U.S. Pat. No. 7,720,580, which are all hereby incorporated herein by reference in their entireties, and/or such as a processor of the type incorporated in Mobileye's EYEQ™ system-on-a-chip video-based object detection sensing system, such as is commercially available from Mobileye Vision Technologies Ltd. of Jerusalem, Israel, or such as any other suitable image data processor) that processes the captured image data and determines or detects objects that are in the forward field of view and beyond the visible or viewable range of the driver. When such objects are detected (such as a deer or other object in the road ahead of the vehicle), an alert (such as an audible or visual alert) is generated to alert the driver that the vehicle is approaching an object that is not yet visible or viewable or discernible to the driver of the vehicle.

The alert may be provided as an iconistic display or image display or video display for viewing by the driver of the host vehicle. Desirably, the display may be located at the interior rearview mirror assembly, such as a display on demand type of display at and behind the mirror reflective element of the interior rearview mirror assembly (such as the types disclosed in U.S. Pat. Nos. 6,690,268; 5,668,663 and/or 5,724,187, and/or in U.S. patent application Ser. No. 10/054,633, filed Jan. 22, 2002, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; and/or Ser. No. 11/021,065, filed Dec. 23, 2004, now U.S. Pat. No. 7,255,451, which are all hereby incorporated herein by reference in their entireties), or such as a slide-out display or the like (such as displays of the types described in U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005, now U.S. Pat. No. 7,370,983, which are hereby incorporated herein by reference in their entireties). The display is activated to display the alert or icon or image/images (such as a video image of the forward scene) in response to a detection of an object by the sensor or imager, and thus is an episodal type of display that is tied to the detection of an object and is activated to display pertinent information to the driver of the vehicle and is deactivated when no object is detected in the forward scene. Thus, the display may provide episodal displays or images or icons as needed to alert the driver that the vehicle is approaching an object that may not yet be visible to the driver, yet is deactivated when not needed so as to avoid bothering or distracting the driver when no object is detected ahead of the vehicle.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, said vehicular exterior rearview mirror assembly comprising:

a mirror reflective element sub-assembly comprising an electrochromic mirror reflective element having a front glass substrate and a rear glass substrate with an electrochromic medium disposed therebetween;

wherein said front glass substrate has a first surface and a second surface separated by a thickness dimension of said front glass substrate;

said second surface of said front glass substrate having a transparent electrically conductive layer disposed thereat;

wherein said rear glass substrate has a third surface and a fourth surface separated by a thickness dimension of said rear glass substrate;

a mirror reflector disposed at the third surface of said rear glass substrate;

wherein said electrochromic medium is disposed in an interpane cavity established between said third surface of said rear glass substrate and said second surface of said front glass substrate and bounded by a perimeter seal;

said mirror reflective element sub-assembly comprising a heater pad disposed at said rear glass substrate;

said mirror reflective element sub-assembly comprising a mirror back plate disposed at said heater pad, said mirror back plate comprising a plate portion having a front plate side facing said heater pad and a rear plate side rearward of and spaced from said front plate side by a thickness dimension of said plate portion of said mirror back plate;

wherein said mirror back plate comprises first structure at said rear plate side;

wherein said first structure is configured to attach at an actuator of said vehicular exterior rearview mirror assembly;

wherein said mirror back plate comprises second structure at said rear plate side;

wherein said mirror back plate is formed by injection molding and wherein said first structure, said second structure and said plate portion of said mirror back plate are formed during injection molding of said mirror back plate;

wherein said heater pad is adhered via a pressure sensitive adhesive to said rear glass substrate;

wherein said mirror back plate is adhered via a pressure sensitive adhesive to said heater pad;

said mirror reflective element sub-assembly comprising an indicator element disposed at said second structure of said mirror back plate, said indicator element having a light source that is activatable to emit light;

wherein said indicator element, when said light source is activated, emits light through a light transmitting portion of said heater pad and through said electrochromic mirror reflective element;

wherein said indicator element and said second structure are configured so that light emitted by said indicator element, when said light source is activated and when said vehicular exterior rearview mirror assembly is attached at a vehicle, exits said mirror reflective element sub-assembly for viewing by a driver of the vehicle;

wherein said indicator element is associated with a blind spot detection system of the vehicle;

wherein said indicator element comprises a diffuser that diffuses light emitted by said light source;

wherein, when said vehicular exterior rearview mirror assembly is attached at the vehicle and when said light source is activated, an icon present at an outboard region of said electrochromic mirror reflective element is illuminated and is viewable by the driver of the vehicle, said outboard region comprising an upper quadrant region of said electrochromic mirror reflective element that is outboard relative to a side of the vehicle at which said vehicular exterior rearview mirror assembly is attached; and wherein said indicator element makes mechanical connection at said second structure when disposed at said second structure.

2. The vehicular exterior rearview mirror assembly of claim 1, wherein said second structure extends at least partially from said rear plate side.

3. The vehicular exterior rearview mirror assembly of claim 2, wherein said indicator element makes electrical connection at said second structure when disposed at said second structure.

4. The vehicular exterior rearview mirror assembly of claim 1, wherein said indicator element is a self-contained unit.

5. The vehicular exterior rearview mirror assembly of claim 4, wherein said self-contained unit is substantially impervious to water ingress.

6. The vehicular exterior rearview mirror assembly of claim 1, wherein said light source comprises at least one light emitting diode.

7. The vehicular exterior rearview mirror assembly of claim 1, wherein said second structure comprises a portion of a passageway.

8. The vehicular exterior rearview mirror assembly of claim 1, wherein said icon is established at said light transmitting portion of said heater pad.

9. The vehicular exterior rearview mirror assembly of claim 8, wherein said icon is established at said light transmitting portion of said heater pad via a pattern formed thereat.

10. The vehicular exterior rearview mirror assembly of claim 1, wherein said icon is established between said rear glass substrate and said mirror back plate.

11. The vehicular exterior rearview mirror assembly of claim 1, wherein said icon is established at said rear glass substrate.

12. The vehicular exterior rearview mirror assembly of claim 11, wherein said icon is established at a layer disposed at said rear glass substrate.

13. The vehicular exterior rearview mirror assembly of claim 12, wherein said icon is established by etching said layer.

14. The vehicular exterior rearview mirror assembly of claim 11, wherein said icon is established through an electrically conductive coating disposed at said rear glass substrate.

15. A vehicular exterior rearview mirror assembly, said vehicular exterior rearview mirror assembly comprising:

a mirror reflective element sub-assembly comprising a mirror reflective element, said mirror reflective element comprising a glass substrate;

said glass substrate having a first surface and a second surface separated by a thickness dimension of said glass substrate;

said mirror reflective element sub-assembly comprising a heater pad disposed at said glass substrate;

said mirror reflective element sub-assembly comprising a mirror back plate disposed at said heater pad, said mirror back plate comprising a plate portion having a front plate side facing said heater pad and a rear plate side rearward of and spaced from said front plate side by a thickness dimension of said plate portion of said mirror back plate;

wherein said mirror back plate comprises first structure at said rear plate side;

wherein said first structure is configured to attach at an actuator of said vehicular exterior rearview mirror assembly;

wherein said mirror back plate comprises second structure at said rear plate side;

wherein said mirror back plate is formed by injection molding and wherein said first structure, said second structure and said plate portion of said mirror back plate are formed during injection molding of said mirror back plate;

wherein said heater pad is adhered via a pressure sensitive adhesive to said glass substrate;

wherein said mirror back plate is adhered via a pressure sensitive adhesive to said heater pad;

said mirror reflective element sub-assembly comprising an indicator element disposed at said second structure of said mirror back plate, said indicator element having a light source that is activatable to emit light;

wherein said indicator element, when said light source is activated, emits light through a light transmitting portion of said heater pad and through said mirror reflective element;

wherein said indicator element and said second structure are configured so that light emitted by said indicator element, when said light source is activated and when said vehicular exterior rearview mirror assembly is attached at a vehicle, exits said mirror reflective element sub-assembly for viewing by a driver of the vehicle;

wherein said light source comprises at least one light emitting diode;

wherein said indicator element is associated with a blind spot detection system of the vehicle;

wherein said indicator element comprises a diffuser that diffuses light emitted by said light source;

wherein, when said vehicular exterior rearview mirror assembly is attached at the vehicle and when said light source is activated, an icon present at an outboard region of said mirror reflective element is illuminated and is viewable by the driver of the vehicle, said outboard region comprising an upper quadrant region of said mirror reflective element that is outboard relative to a side of the vehicle at which said vehicular exterior rearview mirror assembly is attached; and wherein said icon is established through an electrically conductive coating disposed at said glass substrate.

16. The vehicular exterior rearview mirror assembly of claim 15, wherein said second structure extends at least partially from said rear plate side.

17. The vehicular exterior rearview mirror assembly of claim 16, wherein said indicator element makes mechanical connection at said second structure when disposed at said second structure.

18. The vehicular exterior rearview mirror assembly of claim 17, wherein said indicator element is a self-contained unit.

19. The vehicular exterior rearview mirror assembly of claim 18, wherein said self-contained unit is substantially impervious to water ingress.

20. A vehicular exterior rearview mirror assembly, said vehicular exterior rearview mirror assembly comprising:
 a mirror reflective element sub-assembly comprising a mirror reflective element, said mirror reflective element comprising a glass substrate;
 said glass substrate having a first surface and a second surface separated by a thickness dimension of said glass substrate;
 said mirror reflective element sub-assembly comprising a heater pad disposed at said glass substrate;
 said mirror reflective element sub-assembly comprising a mirror back plate disposed at said heater pad, said mirror back plate comprising a plate portion having a front plate side facing said heater pad and a rear plate side rearward of and spaced from said front plate side by a thickness dimension of said plate portion of said mirror back plate;
 wherein said mirror back plate comprises first structure at said rear plate side;
 wherein said first structure is configured to attach at an actuator of said vehicular exterior rearview mirror assembly;
 wherein said mirror back plate comprises second structure at said rear plate side;
 wherein said mirror back plate is formed by injection molding and wherein said first structure, said second structure and said plate portion of said mirror back plate are formed during injection molding of said mirror back plate;
 wherein said heater pad is adhered via a pressure sensitive adhesive to said glass substrate;
 wherein said mirror back plate is adhered via a pressure sensitive adhesive to said heater pad;
 said mirror reflective element sub-assembly comprising an indicator element disposed at said second structure of said mirror back plate, said indicator element having a light source that is activatable to emit light;
 wherein said indicator element, when said light source is activated, emits light through a light transmitting portion of said heater pad and through said mirror reflective element;
 wherein said indicator element and said second structure are configured so that light emitted by said indicator element, when said light source is activated and when said vehicular exterior rearview mirror assembly is attached at a vehicle, exits said mirror reflective element sub-assembly for viewing by a driver of the vehicle;
 wherein said light source comprises at least one light emitting diode;
 wherein said indicator element is associated with a blind spot detection system of the vehicle;
 wherein said indicator element comprises a diffuser that diffuses light emitted by said light source;
 wherein said indicator element is a self-contained unit;
 wherein, when said vehicular exterior rearview mirror assembly is attached at the vehicle and when said light source is activated, an icon present at an outboard region of said mirror reflective element is illuminated and is viewable by the driver of the vehicle; and
 wherein said icon is established through an electrically conductive coating disposed at said glass substrate.

21. The vehicular exterior rearview mirror assembly of claim 20, wherein said outboard region comprises an upper quadrant region of said mirror reflective element that is outboard relative to a side of the vehicle at which said vehicular exterior rearview mirror assembly is attached.

22. The vehicular exterior rearview mirror assembly of claim 21, wherein said second structure extends at least partially from said rear plate side.

23. The vehicular exterior rearview mirror assembly of claim 21, wherein said indicator element makes mechanical connection at said second structure when disposed at said second structure.

24. The vehicular exterior rearview mirror assembly of claim 21, wherein said icon is established by etching.

25. The vehicular exterior rearview mirror assembly of claim 24, wherein said self-contained unit is substantially impervious to water ingress.

* * * * *